US008484277B2

(12) United States Patent
Shemirani et al.

(10) Patent No.: US 8,484,277 B2
(45) Date of Patent: Jul. 9, 2013

(54) TRANSFORMING SIGNALS USING PASSIVE CIRCUITS

(75) Inventors: Mahdieh B. Shemirani, Stanford, CA (US); Farshid Aryanfar, Sunnyvale, CA (US)

(73) Assignee: Rambus Inc., Sunnyvale, CA (US)

( * ) Notice: Subject to any disclaimer, the term of this patent is extended or adjusted under 35 U.S.C. 154(b) by 611 days.

(21) Appl. No.: 12/746,526

(22) PCT Filed: Dec. 5, 2008

(86) PCT No.: PCT/US2008/085712
§ 371 (c)(1), (2), (4) Date: Jun. 6, 2010

(87) PCT Pub. No.: WO2009/076223
PCT Pub. Date: Jun. 18, 2009

(65) Prior Publication Data
US 2011/0090100 A1 Apr. 21, 2011

Related U.S. Application Data

(60) Provisional application No. 61/012,373, filed on Dec. 7, 2007.

(51) Int. Cl.
*G06F 17/14* (2006.01)

(52) U.S. Cl.
USPC .......... 708/403

(58) Field of Classification Search
None
See application file for complete search history.

(56) References Cited

U.S. PATENT DOCUMENTS

| | | | |
|---|---|---|---|
| 3,170,158 | A | 2/1965 | Rotman |
| 4,080,605 | A | 3/1978 | Hilton |
| 4,980,692 | A | 12/1990 | Rudish et al. |

(Continued)

FOREIGN PATENT DOCUMENTS

| | | |
|---|---|---|
| DE | 2732627 A1 | 2/1979 |
| WO | 00/11754 | 3/2000 |

OTHER PUBLICATIONS

Kira et al., New Design Approach to Multiple-Beam Forming Network for Beam-Steerable Phased Array Antennas, IEICE Trans. Electron., vol. E82-C, No. 7, Jul. 1999, pp. 1195-1201.

(Continued)

*Primary Examiner* — David H Malzahn

(57) ABSTRACT

Passive signal combiners are employed to transform at least one signal from one domain to another. In some aspects the transformation comprises an FFT, an IFFT, a DFT, or an IDFT. In some implementations the passive signal combiners comprise a set of planar waveguides (e.g., which may be referred to as beamformers or Rotman lenses) that have multiple inputs and outputs and are configured to provide orthogonal output signals. In some implementations an electrical signal (e.g., received via an antenna element) is coupled to passive beamformers that transform the electrical signal from one domain to another domain. Here, a transformation of the electrical signal by a given passive beamformer may have a first resolution, and outputs from the passive beamformers may correspond to orthogonal groups. A combiner circuit may be used to combine the outputs from the passive beamformers and produce a combined output having a second resolution and an associated error. In some aspects, this error may be less than a cumulative error associated with the passive beamformers if a single passive beamformer was instead employed to transform the electrical signal at the second resolution. Also, by using at least partially different bandwidths for components in the circuits, a higher effective bandwidth for the transformation may be achieved.

28 Claims, 18 Drawing Sheets

U.S. PATENT DOCUMENTS

| | | | | |
|---|---|---|---|---|
| 5,357,337 | A | 10/1994 | Michon et al. | |
| 5,495,258 | A | 2/1996 | Muhlhauser et al. | |
| 5,812,089 | A | 9/1998 | Locke | |
| 7,170,442 | B2 | 1/2007 | Lovberg et al. | |
| 7,200,630 | B2 * | 4/2007 | Lazaro Villa et al. | 708/403 |
| 7,224,239 | B2 | 5/2007 | Ulm et al. | |
| 7,742,701 | B2 * | 6/2010 | Taylor | 398/83 |
| 8,050,564 | B2 * | 11/2011 | Taylor | 398/83 |
| 2006/0210211 | A1 * | 9/2006 | Taylor | 385/1 |
| 2009/0160576 | A1 * | 6/2009 | Dent | 333/139 |
| 2011/0110660 | A1 * | 5/2011 | Taylor | 398/34 |
| 2011/0123197 | A1 * | 5/2011 | Taylor | 398/79 |

OTHER PUBLICATIONS

Kira et al., Beam Forming Network Design Using Microstrip Lens for Cluster Feeding, IEEE, 2003, pp. 523-528.

Ueno, a Systematic Design Formulation for Butler Matrix Applied FFT Algorithm, IEEE Transactions of Antennas and Propagation, vol. AP-29, No. 3, May 1981, pp. 496-501.

Tsui et al., U.S. Statutory Invention Registration No. H2109H, Sep. 7, 2004.

* cited by examiner

TRANSFORMING SIGNALS USING PASSIVE CIRCUITS

CLAIM OF PRIORITY

This application claims the benefit of and priority to commonly owned U.S. Provisional Patent Application No. 61/012,373, filed Dec. 7, 2007, the disclosure of which is hereby incorporated by reference herein.

TECHNICAL FIELD

This application relates generally to signal processing and more specifically, but not exclusively, to transforming signals using passive circuits.

BACKGROUND

A signal processing system may perform operations that involve transforming a signal from one domain to another through the use of the Fourier transform or some other suitable transform. Implementations of the Fourier transform, such as the fast Fourier transform ("FFT"), the inverse FFT ("IFFT"), the discrete Fourier transform ("DFT"), and the inverse DFT ("IDFT"), are used in a wide variety of applications and devices. As one example, a communication system may employ the DFT to transform a time domain signal to a frequency domain signal to perform noise reduction operations in the frequency domain and then employ the IDFT to transform the resulting signal back to the time domain.

In practice, transformation operations may consume a relatively large amount of power and/or processing resources. For example, in some applications FFT, IFFT, DFT, or IDFT operations may be computationally intensive in that they may involve a relatively large number of multiply and accumulate operations per second. Consequently, a processor that performs these operations may consume a significant amount of power. This power consumption problem may be exacerbated in high data rate applications, where the processor that performs transform operations may be one of the main sources of power consumption in a system. Also, in some applications an analog signal may be converted to a digital signal and digital signal processing may be employed to transform the digital signal from one domain to another. In such a case, the frequency conversion, analog-to-digital (ND) conversion before processing, and digital-to-analog (D/A) conversion after processing results in additional power consumption. For some applications (e.g., portable wireless devices, sensors, spaceborne systems, and other applications that involve the processing of high speed signals but where available power may be limited), the use of such transform techniques may be problematic due to the high power consumption.

Moreover, conventional techniques for implementing the FFT, DFT, or IDFT may employ a relatively large number of elements that occupy a large area and that have a large number of interconnections. These factors may result in significant signal propagation or processing delays in some cases. Additionally, conventional techniques may store partial products and coefficients in memory during transform operations, which may increase hardware complexity.

In view of the above, conventional transform techniques may be difficult to implement at high data rates (e.g., microwave frequencies) and may have poor performance at these frequencies. Consequently, a need exists for more effective techniques for transforming signals.

BRIEF DESCRIPTION OF THE DRAWINGS

Sample features, aspects and advantages of the disclosure will be described in the detailed description and appended claims that follow and the accompanying drawings, wherein:

Figure 1:
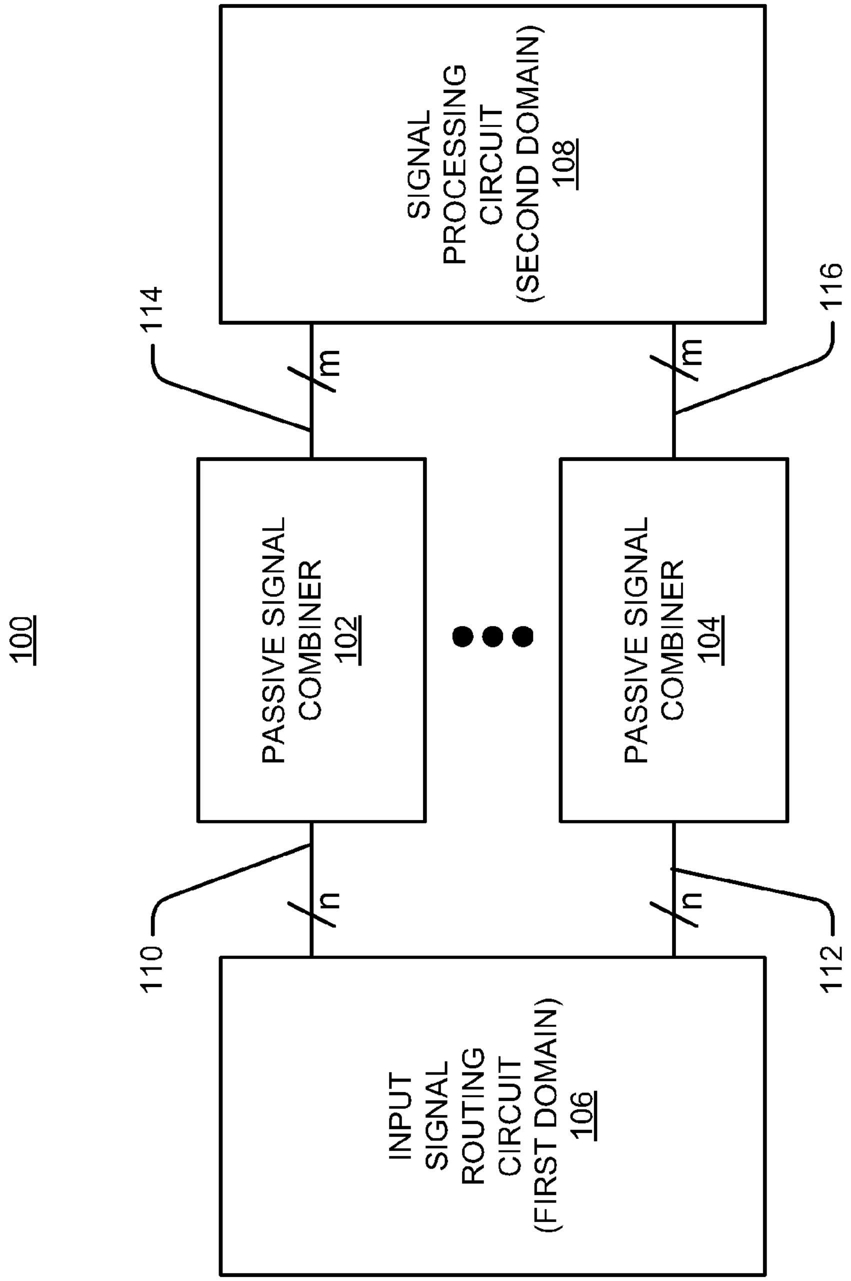
FIG. 1 is a simplified block diagram of an embodiment of signal processing apparatus including passive signal combiners.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals may be used to denote like features throughout the specification and figures.

DETAILED DESCRIPTION

FIG. 1 illustrates a signal processing apparatus 100 that uses two or more passive signal combiners (as represented by passive signal combiners 102 and 104 and the associated ellipsis) to transform a signal associated with a first domain to a second domain. In FIG. 1, an input signal circuit 106 provides a first domain signal and an output signal associated with a second domain is provided to a signal processing circuit 108. In some aspects, the apparatus 100 may be used to perform a DFT on a time domain analog signal to provide a frequency domain analog signal or the apparatus 100 may be used to perform an IDFT on a frequency domain analog signal to provide a time domain analog signal.

As will be described in more detail below, in some implementations the passive signal combiners 102 and 104 may comprise planar waveguide circuits that impart phase shifts on input signals and combine the phase shifted signals to provide orthogonal output signals. Such circuits may be known or implemented as beamformers or Rotman lenses. In some implementations the passive signal combiners 102 and 104 may be implemented using other passive (i.e., non-active) components.

Through the use of such passive circuits, the apparatus 100 may effectively transform high-speed signals (e.g., GHz signals) without consuming excessive power. For example, a passive signal combiner as taught herein may be used to transform an analog signal without converting the analog signal to a digital signal. Also, in applications where a signal that was previously upconverted (e.g., a received modulated RF signal) is to be transformed, a passive signal combiner as taught herein may be used to transform the signal without first downconverting the signal to a lower (e.g., baseband) frequency. Hence, the apparatus 100 may advantageously transform a signal without consuming power associated with such downconversion and analog-to-digital conversion operations.

Moreover, the apparatus 100 may more accurately transform a signal through the use of multiple passive signal combiners. For example, by distributing an input signal to several passive signal combiners, each of the passive signal combiners may generate a subset of the orthogonal signals associated with the second domain. Hence, the resolution of the final transformed signal is based on the combined resolution all of the subsets. As discussed in more detail below, the error associated with such a transformation may be lower than the error that may be obtained using a single passive signal combiner of comparable size that has a comparable resolution.

Figure 2:
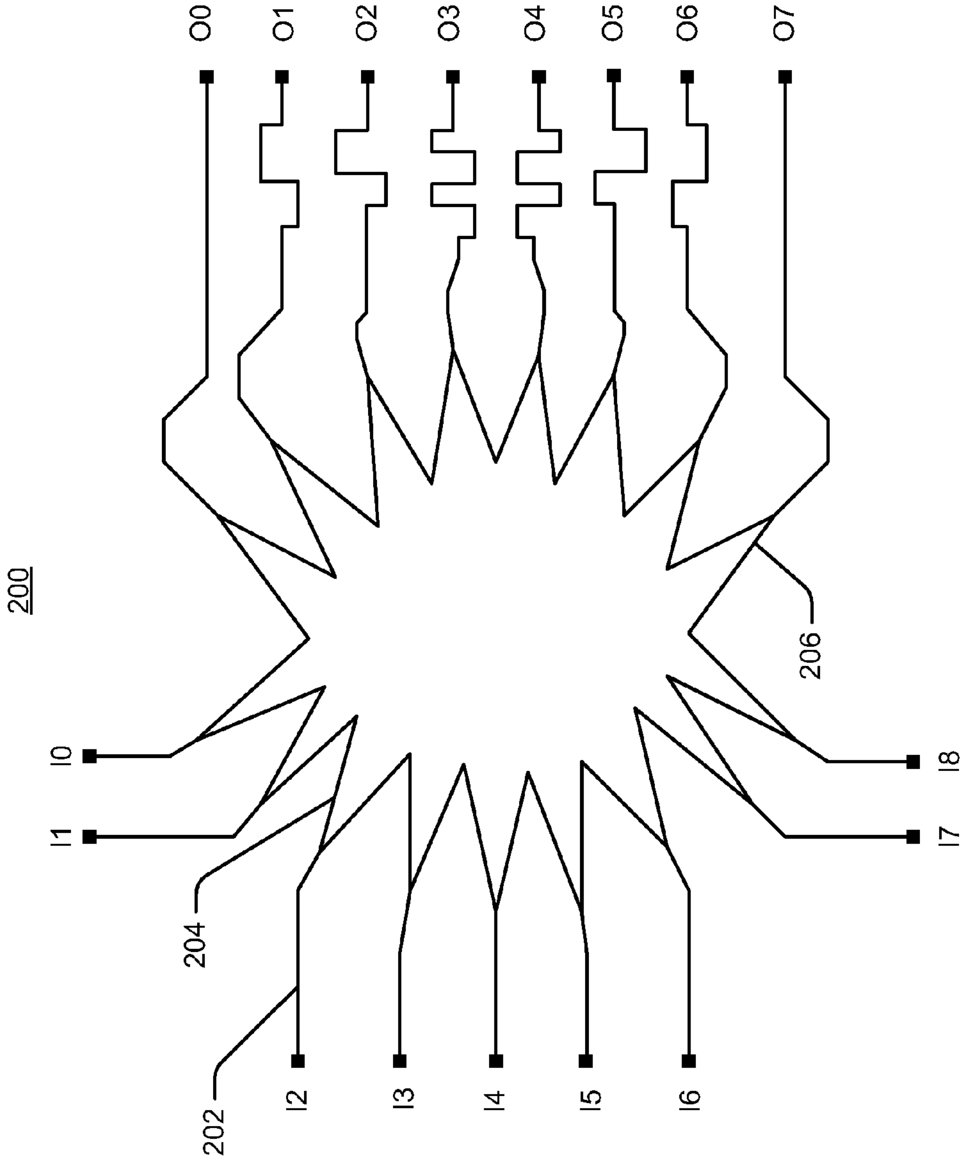
FIG. 2 is a simplified diagram of an embodiment of a planar waveguide.

FIG. 2 illustrates an embodiment of a planar waveguide 200 embodied in a form that may be referred to as a beamformer or a Rotman lens. The planar waveguide 200 may be implemented, for example, as a thin, substantially planar piece of conductive metal (e.g., copper). In this example, the planar waveguide 200 includes nine input ports (labeled I0-I8) and eight output ports (labeled O0-O7).

As an electrical signal is received at an input port (e.g., I2), the signal is coupled by a transmission line (e.g., line 202) to an associated projection (e.g., projection 204) of the planar waveguide 200. As the electrical signal enters the main body of the planar waveguide 200 (e.g., projection 204), the signal may be subjected to diffraction whereby the signal may propagate via multiple wavefronts toward projections (e.g., projection 206) associated with the output ports. Here, different phase shifts may be imparted on these signal wavefronts as they propagate through the planar waveguide 200. In addition, the planar waveguide 200 may be sized and shaped such that a desired phase shift is imparted on a given input signal by the time that input signal reaches a given output port.

In some aspects, input and output projections of the planar waveguide 200 may be located and oriented so that certain input signals will effectively propagate (e.g., with relatively high signal level) to certain output nodes. By operation of constructive and destructive interference of signals propagating through the waveguide, these input signals will combine in a deterministic manner at each of the output projections (e.g., projection 206).

As discussed herein, the planar waveguide 200 may be sized and shaped such that the signals at the output nodes are orthogonal. As a specific example, in an embodiment where the resolution for a transform operation is denoted by N (e.g., the total number of output ports for all of the planar waveguides in the apparatus is N), each planar waveguide may be configured such that a phase associated with each output node differs by $2\pi/N$.

Figure 3:
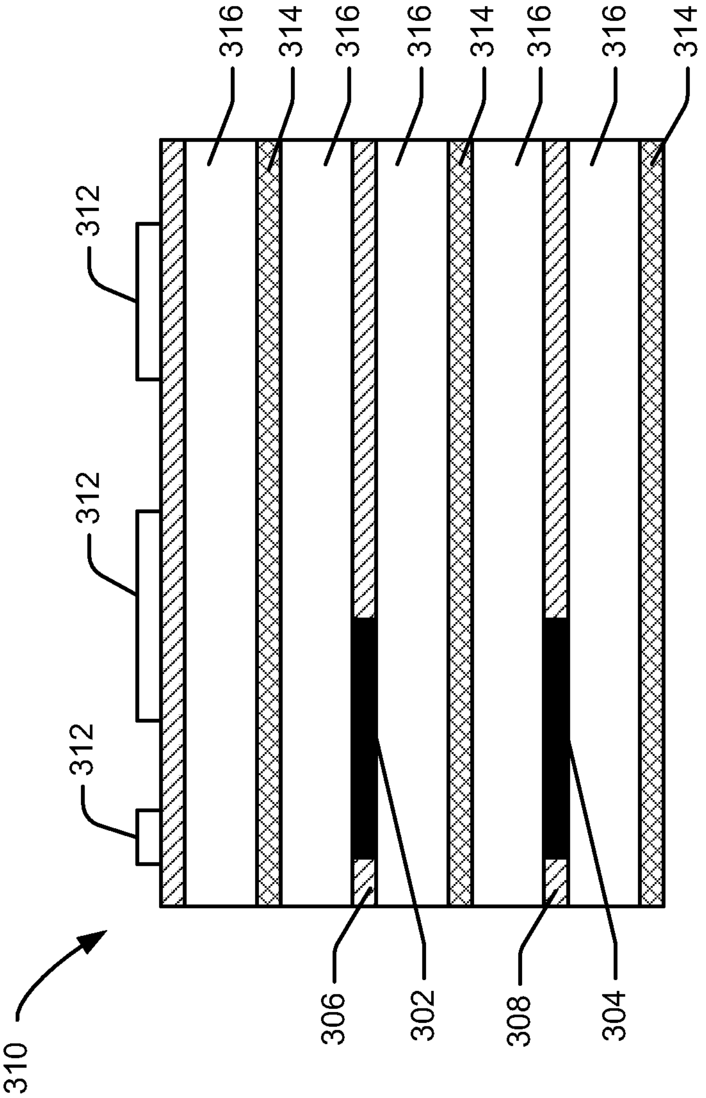
FIG. 3 is a simplified diagram of an embodiment of planar waveguides embodied in metal layers of a printed circuit board.

FIG. 3 illustrates an embodiment where planar waveguides 302 and 304 are embodied in metal layers 306 and 308, respectively, of a printed circuit board 310. Advantageously, in this embodiment the planar waveguides 302 and 304 do not take up space on the top or bottom of the printed circuit board which may therefore, be used for placement of one or more other components 312 (e.g., other signal processing circuitry as described herein). Here, a component 312 may comprise, for example, an integrated circuit die or package that is coupled to the planar waveguides 302 and 304 via appropriate signal paths (not shown in FIG. 3).

As shown in FIG. 3, in some implementations the planar waveguides 302 and 304 may be stacked one above the other to more efficiently utilize space on the printed circuit board 310. For example, by placing the planar waveguides 302 and 304 in one area of the printed circuit board 310, remaining areas of the metal layers 306 and 308 may be more easily used for other purposes (e.g., for routing signals between other signal processing circuitry as described herein). It should be appreciated that planar waveguides may be advantageously placed in different locations in different implementations. For example, planar waveguides may be placed on opposite sides of a printed circuit board (e.g., on the same metal layer) to facilitate signal path routing on some other layer.

In the example of FIG. 3, the planar waveguides 302 and 304 are located between ground planes 314 (and separated by dielectric layers 316 of the printed circuit board). In this way, the impedance of the planar waveguides 302 and 304 may be effectively controlled.

In some implementations planar waveguides may be embodied in one or more integrated circuit devices. For example, a set of planar waveguides (e.g., Rotman lenses) may be implemented in the package of an integrated circuit that incorporates one or more the other signal processing components described herein (e.g., one or more of the components of FIGS. 1, 5, 6, 7, 8A, 8B, and so on). Here, the planar waveguide may be implemented adjacent to the integrated circuit die (e.g., in a stacked arrangement similar to FIG. 3) and coupled to the die via appropriate signal paths. Also, in some cases the planar waveguides may be implemented on an integrated circuit die (e.g., which may or may not embody other signal processing components as discussed herein). Such a configuration may be used, for example, when the frequency of the signal to be transformed is very high (e.g., on the order of 60-100 GHz or higher) and/or through the use of high permittivity materials.

Sample operational flow that may be employed by a signal processing apparatus such as the apparatus 100 will now be described with reference to FIG. 4. For convenience, the operations of FIG. 4 (or any other operations discussed or taught herein) may be described as being performed by specific components. It should be appreciated, however, that these operations may be performed by other types of components and may be performed using a different number of components. It also should be appreciated that one or more of the operations described herein may not be employed in a given implementation.

Figure 4:
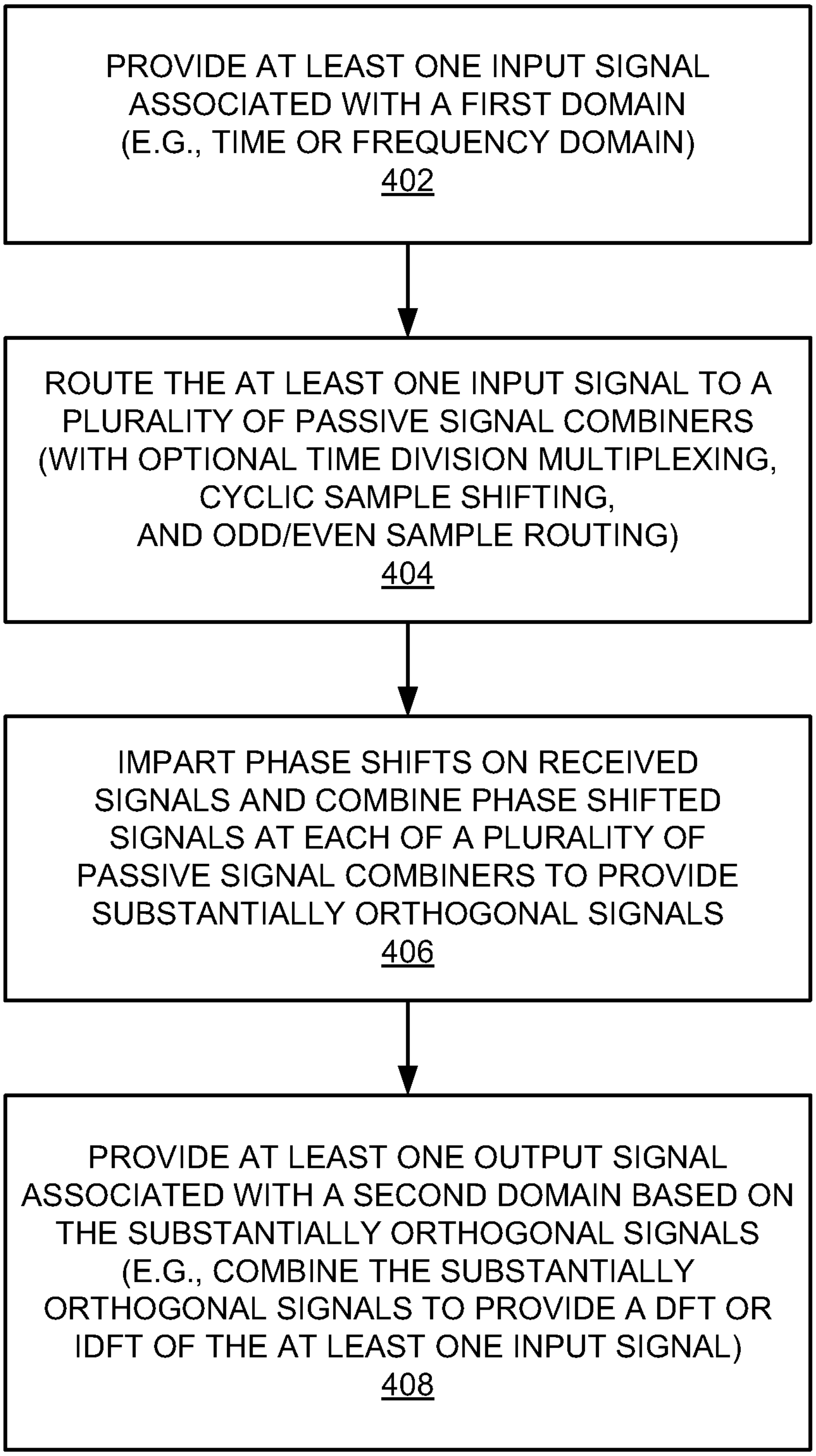
FIG. 4 is a flowchart of an embodiment of operations that may be performed in conjunction with using passive signal combiners to convert a signal from one domain to another.

As represented by block 402 of FIG. 4, the signal processing apparatus may include a signal source (not shown in FIG. 1) that provides at least one signal. For example, such a signal source may generate one or more signals or output one or more signals received from another apparatus. As an example of the former case, the signal source may comprise a signal processor that provides processed signals. As an example of the latter case, the signal source may comprise part of a radio frequency ("RF") receive chain that receives RF signals.

As will be described in more detail below, in some cases the signal source provides multiple signals. For example, the signal processing apparatus may include an array of antenna elements whereby each antenna element provides an RF signal or the signal source may include parallel processing components that output signals in parallel.

In some aspects, a signal provided at block 402 is associated with a particular domain. For example, such a signal may be a time domain signal or a frequency domain signal.

As represented by block 404, the signal processing apparatus (e.g., the input signal routing circuit 106) routes the input signal(s) to several passive signal combiners (e.g., passive signal combiners 102 and 104). This routing may be implemented in various ways.

In some cases a routing circuit couples a single input signal to multiple inputs of each passive signal combiner. For example, in a case where each passive signal combiner has "n" input ports, a routing circuit may each input port.

A routing circuit also may impart different phase shifts on the signals provided to different inputs of a given passive signal combiner. For example, the routing circuit may employ different delay lines in the signal paths leading to the inputs of the passive signal combiner 102.

A routing circuit also may impart different phase shifts on the sets of signals provided to different passive signal combiners. For example, the routing circuit may employ one set of delay lines in the signal paths leading to the inputs of the passive signal combiner 102 and employ a different set of delay lines in the signal paths leading to the inputs of the passive signal combiner 104.

In some cases a routing circuit couples multiple input signals to the inputs of the passive signal combiners. For example, a first input signal may be coupled to the inputs of a first passive signal combiner, a second input signal may be coupled to the inputs of a second passive signal combiner, and so on. Conversely, a first input signal may be coupled to a first input of each of the passive signal combiners, a second input signal may be coupled to a second input of each of the passive signal combiners, and so on.

In some cases a routing circuit couples different portions of an input signal to different passive signal combiners. For example, a routing circuit may comprise a serial-to-parallel converter or multiplexer (e.g., a time division multiplexer) that routes a first sample of an input signal (e.g., a portion of the input signal associated with a first period of time) to a first passive signal combiner, routes a second sample of an input signal (e.g., a portion of the input signal associated with a second period of time) to a second passive signal combiner, and so on. In such a case, the routing circuit may incorporate dispersive transmissions lines to spread out the sample provided to a given passive signal combiner so that the input signal for the passive signal combiner will be substantially continuous. For example, if a single input signal is time division multiplexed between four passive signal combiners, each sample may be spread out in time by a factor of four. It should be appreciated that in such a case, the bandwidth of each passive signal combiner may be narrower (e.g., by a factor of four) as compared to the bandwidth of a passive signal combiner that processes the entire input signal.

As will be discussed in more detail below, a routing circuit may route samples to one or more passive signal combiners in different ways in different embodiments. For example, in some cases a routing circuit performs a cyclic shift on input signal samples before providing the samples to one or more passive signal combiners. In some cases a routing circuit provides a certain set of samples (e.g., even samples) to one passive signal combiner and provides another set of samples (e.g., odd samples) to another passive signal combiner.

In some cases a routing circuit couples input signals associated with different frequency bands to different passive signal combiners. Here, different input signals or different sets of inputs signals may be associated with different frequency bands. In such a case, the different passive signal combiners may have different frequency passbands. For example, the passband of a given passive signal combiner may be defined to correspond to the passband of the signals to be processed by that passive signal combiner. Also, a frequency passband associated with a routing circuit may be different (e.g., wider) than a frequency passband or passbands associated with the passive signal combiners.

As represented by block 406 of FIG. 4, the passive signal combiners generate substantially orthogonal (e.g., orthogonal or approximately orthogonal) output signals based on the input signals. For example, in FIG. 1 the passive signal combiners 102 and 104 may process their respective input signals in parallel to provide output signals (e.g., "m" output signals) on signal paths 114 and signal paths 116, respectively.

As discussed above, a given passive signal combiner may impart phase shifts on the signals received at the input ports of that passive signal combiner and combine the phase shifted signals to provide output signals at the output ports of that passive signal combiner. Here, the output signals of a given passive signal combiner may be substantially orthogonal to one another and each of the output signals of a given passive signal combiner may be orthogonal to each of the output signals of every other passive signal combiner. For example, in FIG. 1, each of the output signals provided on the signal paths 114 may be orthogonal to one another and to each of the output signals provided on the signal paths 116.

As represented by block 408, a signal processing apparatus may thus provide one or more output signals based on the signals from the passive signal combiners. In some cases (e.g., where the signal processing circuit 108 operates on input data in parallel), the output signals may simply comprise the signals output by the passive signal combiners. In other cases, the signal processing apparatus (e.g., a routing circuit) combines the signals output by the passive signal combiners to provide one or more output signals.

By the above operations, the signals output by the signal processing apparatus may represent a transformation of the inputs signal(s) to another domain. As mentioned above, in some aspects such a transformation may comprise a DFT or an IDFT. An example of a signal processing apparatus that performs a DFT or an IDFT will now be described in more detail with reference to FIG. 5 and FIG. 6, respectively.

Figure 5:
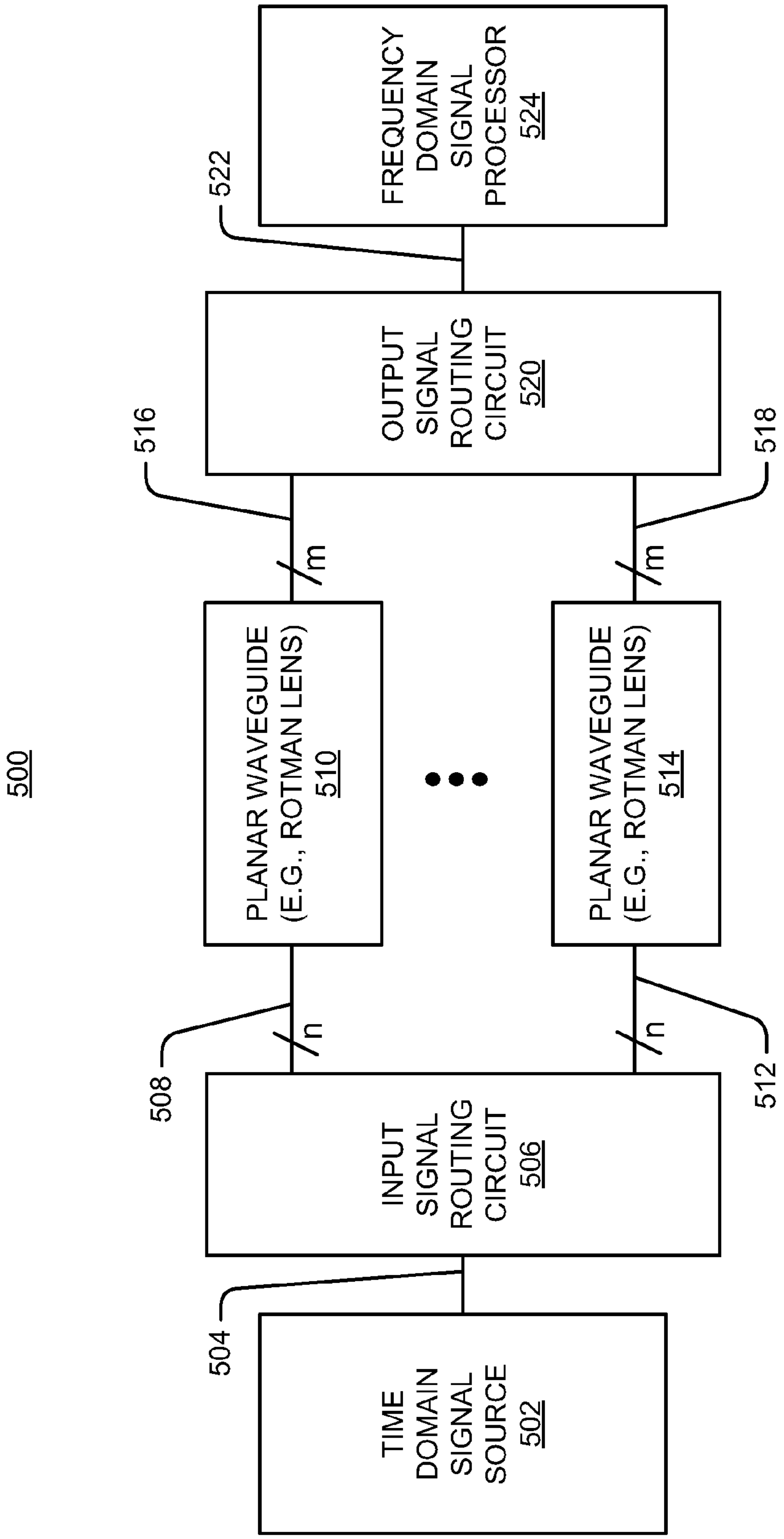
FIG. 5 is a simplified block diagram of an embodiment of a signal processing apparatus configured to perform a discrete Fourier transform.

In the embodiment of FIG. 5, an apparatus 500 employs parallel planar waveguides as taught herein to perform a DFT operation to transform one or more time domain signals to one or more frequency domain signals. Initially, a time domain signal source 502 may generate or otherwise provide one or more time domain signals 504.

An input signal routing circuit 506 receives the time domain signal(s) 504 and provides a set of signals 508 to a planar waveguide 510 and a set of signals 512 to a planar waveguide 514. As represented by the ellipsis in FIG. 5, the input signal routing circuit 506 also may provide additional sets of signals to additional planar waveguides (not shown). As discussed above, the input signal routing circuit 506 may comprise a series of signal splitters (and, optionally, delay lines) or other suitable circuitry to couple the time domain signal(s) 504 to the planar waveguides.

Each of the planar waveguides generates a set of orthogonal output signals that represent a frequency domain transform of the input signal(s). For example, the planar waveguide 510 provides a set of signals 516, each of which may correspond to a different frequency component of the time domain signal(s) 504. Similarly, the planar waveguide 514 provides a set of signals 518, each of which may correspond to a different frequency component of the input signal(s).

An output signal routing circuit 520 processes (e.g., combines) the signals from the planar waveguides to provide one or more frequency domain output signals 522. For example, the output signal routing circuit 520 may comprise a hierarchy of combiners such as magic-Ts (e.g., a four-port microwave or hybrid splitter/combiner, also referred to as a "magic tee") that successively combine pairs of signals from the sets of signals 516 and 518 to provide the output signal(s) 522.

A frequency domain signal processor 524 then processes the frequency domain output signals 522 in the manner specified for a particular application. For example, the frequency domain signal processor 524 may perform filtering operations, error processing, or some other suitable processing operation.

Figure 6:
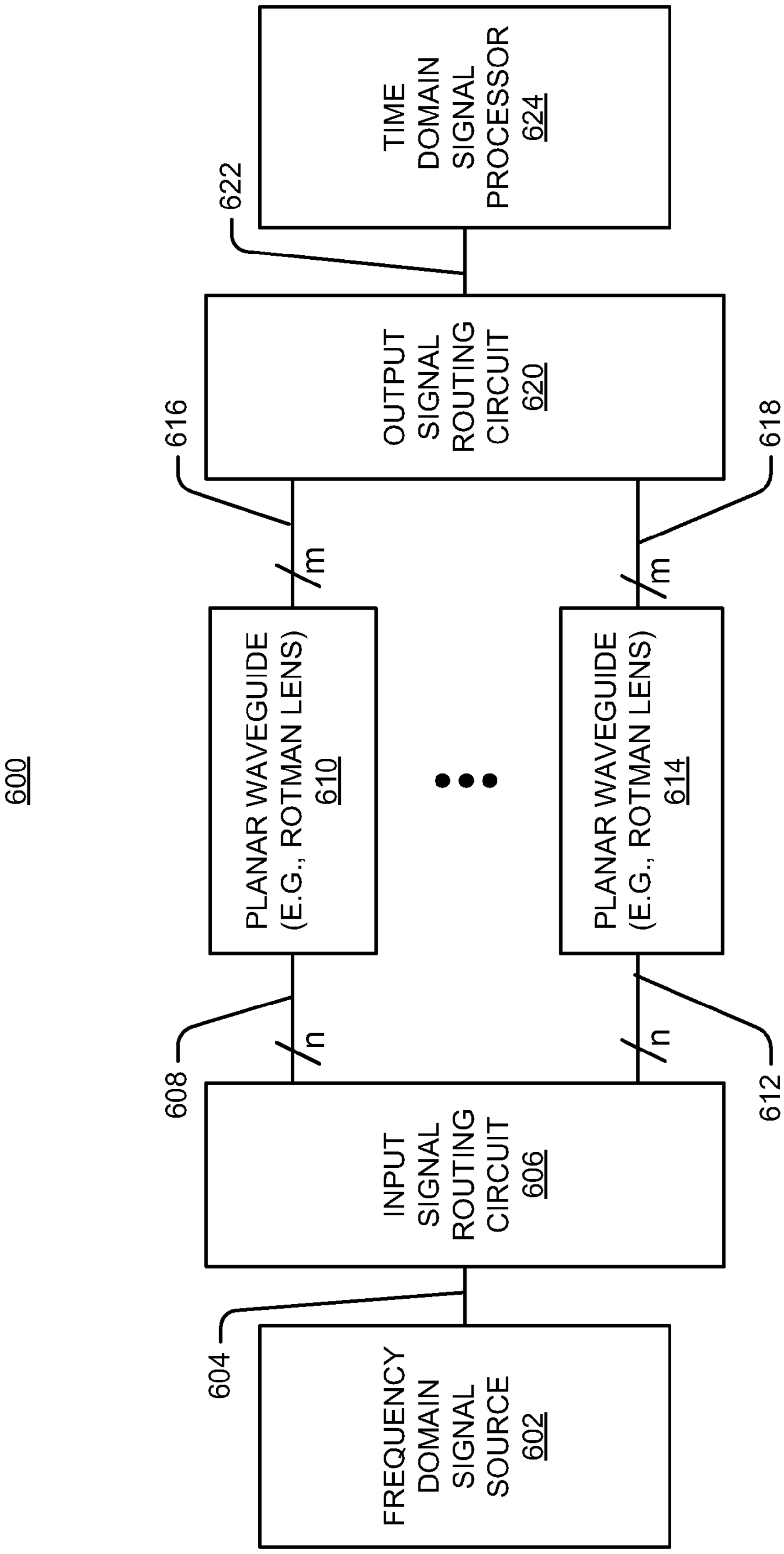
FIG. 6 is a simplified block diagram of an embodiment of a signal processing apparatus configured to perform an inverse discrete Fourier transform.

FIG. 6 illustrates an embodiment of an apparatus 600 that employs parallel planar waveguides as taught herein to perform an IDFT operation. In some aspects, the functionality of the apparatus 600 is complementary to the functionality of the apparatus 500.

A frequency domain signal source 602 generates or otherwise provides one or more frequency domain signals 604. For example, the frequency domain signal source 602 may comprise a frequency domain signal processor that processes frequency domain signals and then outputs the signals for conversion to (e.g., back to) the time domain.

An input signal routing circuit 606 receives the frequency domain signal(s) to provide a set of signals 608 to a planar waveguide 610 and a set of signals 612 to a planar waveguide 614. As represented by the ellipsis in FIG. 6, the input signal routing circuit 606 also may provide additional sets of signals to additional planar waveguides (not shown). In some cases, the input signal routing circuit 606 may comprise a set of filters, a multiplexer, or other suitable circuitry to couple different samples of the frequency domain signal(s) to different planar waveguides. Alternatively, in cases where the frequency domain signal source 602 provides the frequency domain signals 604 in parallel, the input signal routing circuit 606 may simply route different frequency domain signals to different input ports of the planar waveguides.

In any event, the input signal routing circuit 606 provides a set of signals, each of which may correspond to a different frequency component, to the inputs of the planar waveguides. For example, each signal of the sets of signals 608 and 612 may correspond to a different frequency component.

Each of the planar waveguides, in turn, generates a set of orthogonal output signals that represent a time domain transform of the frequency domain signal(s) input to that planar waveguide. For example, the planar waveguide 610 outputs a set of signals 616, each of which may correspond to a different temporal component associated with the set of signals 608. Similarly, the planar waveguide 614 outputs a set of signals 618, each of which may correspond to a different temporal component of the set of signals 612.

An output routing circuit 620 processes (e.g., combines) the signals from the planar waveguides to provide one or more time domain output signals 622. For example, the output signal routing circuit 620 may comprise a multiplexer that outputs each signal from the sets of signal 616 and 618 at a different time to provide one or more output signals (e.g., a continuous time signal).

A time domain signal processor 624 then processes the time domain output signal(s) 622 in the manner specified for a particular application. For example, the time domain signal processor 624 may output the signal(s), transmit the signal(s), or perform some other suitable processing operation.

With the above in mind, additional details relating to performing DFT or IDFT operations using passive devices will be described for illustration purposes in the context of a wireless communication system. It should be appreciated that the operations and components described herein may be implemented in other types of systems and apparatuses in other embodiments.

In the discussion that follows, one or more passive beamformers (for example, one or more Rotman lenses) are used to perform a DFT or an IDFT. A Rotman lens, which is sometimes referred to as a Rotman-Turner lens, may include an array of delay lines and a propagation media confined by two parallel plates. Additionally, a Rotman lens may have three focal points along a circular arc, one on the central axis and the other two symmetrically located on either side. The described transform operations may be performed, for example, on analog, continuous time electrical signals at microwave frequencies (e.g., between 1 and 300 GHz). Moreover, these operations may offer one or more of: a significant reduction in power consumption, fast processing, simpler circuits, or lower cost.

Figure 7:
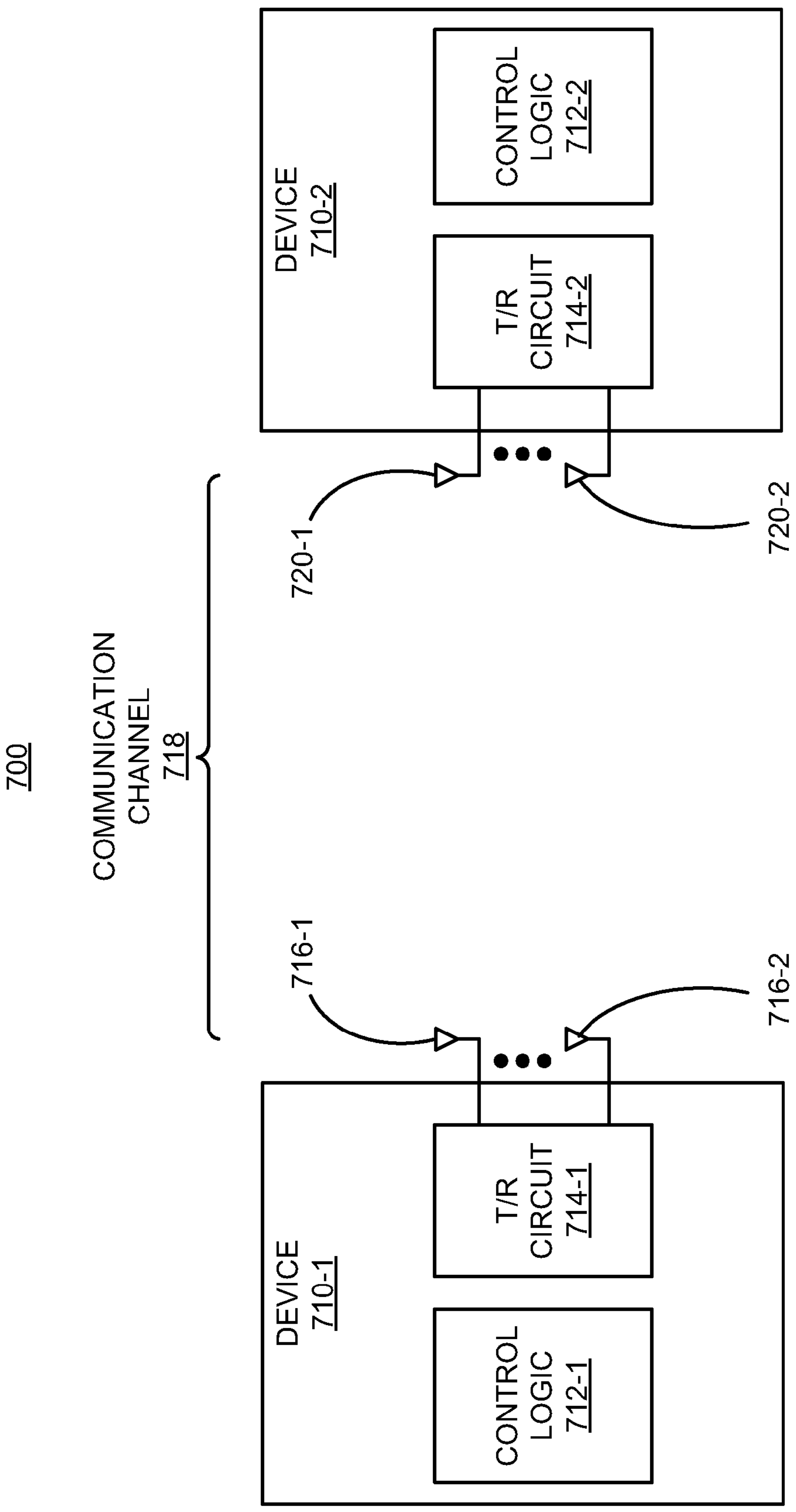
FIG. 7 is a simplified block diagram illustrating an embodiment of a communication system.

FIG. 7 illustrates an embodiment of a communication system 700. In this system, device 710-1 communicates information with device 710-2 via a communication channel 718 using wireless communication. In particular, transmit/receive ("T/R") circuit 714-1 encodes and/or modulates data, and outputs corresponding signals to one or more antenna elements or antennas 716. These signals are received by one or more antenna elements or antennas 720 and decoded and/or demodulated by transmit/receive circuit 714-2.

One or more antenna elements in a given device, such as device 710-1, may be included in a phased-array antenna. The phased-array antenna may output and/or receive signals in a given frequency band (e.g., in one example, a frequency band of about 7 GHz, centered on or about 60 GHz). A phased-array antenna may comprise micro-stripline elements. These elements may be configured to output and/or receive signals having, for example, a frequency between 50 and 90 GHz. Moreover, the phased-array antennas may transmit and receive shaped beams. For example, the shaped beams may have a beam width on the order of 15-25°.

Phased-array antennas may facilitate communication of information between the devices 710 using signals modulated onto high carrier frequencies (such as 60 GHz), or in communication systems in which the transmission power is restricted (such as less than 10 mW) and the communication may be over distances on the order of 10 m. In particular, signals transmitted by one of the devices 710 may reflect off of optional objects in proximity to the devices 710. Moreover, multi-path communication (and multi-path signals) may be associated with signals being scattered off of the optional objects. Consequently, communication between the devices 710 may occur via direct (line-of-sight) and/or indirect (also referred to as multi-path or non-line-of-sight) communication paths (which may include line-of-sight or near line-of-sight communication).

Figure 8A:
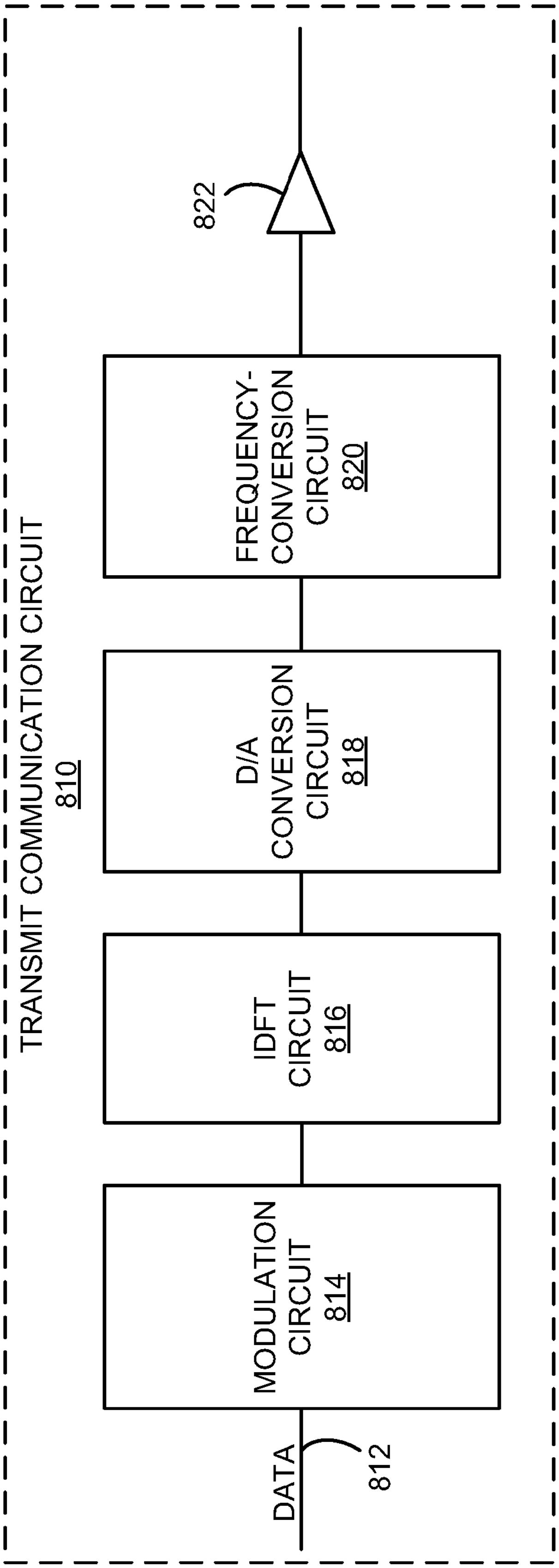
FIG. 8A is a simplified block diagram illustrating an embodiment of a communication circuit.

A given communication path may include multiple sub-channels, such as those used in OFDM or in discrete multi-tone communication (which is described further below with reference to FIGS. 8A and 8B). A range of frequencies, a frequency band, or groups of frequency bands may be associated with a given sub-channel or frequency band. Frequency bands for adjacent sub-channels may partially or completely overlap, or may not overlap. For example, there may be partial overlap of neighboring frequency bands, which occurs in so-called approximate bit loading. Moreover, signals on adjacent sub-channels may be orthogonal.

Signals carried on these sub-channels may be encoded and may be time-multiplexed and/or frequency-multiplexed. Communication of information on the communication channel 718 may use, for example: time-division multiple access (TDMA), frequency-division multiple access (FDMA), or code-division multiple access (CDMA).

Control logic 712 in either or both of the devices 710 may be used to dynamically configure the transmit/receive circuits 714. For example, the number of sub-channels may be changed, or the data rate may be modified based on the performance (which may also be referred to as signal condition) associated with the communication path. Here, characterization of the signal condition may include determining or measuring: a signal strength (such as a signal amplitude or a signal intensity), a mean-square error (MSE) relative to a target (such as a threshold, a point in a constellation diagram, and/or a sequence of points in a constellation diagram), a signal-to-noise ratio (SNR), a bit-error rate (BER), a timing margin, and/or a voltage margin. The characterization of the communication path 718 may be performed continuously, after a time interval has elapsed since a previous characterization of the communication path, or as needed.

The communication system 700 may include fewer components or additional components. Moreover, two or more components may be combined into a single component, and the position of one or more components may be changed. For example, one or more of the devices 710 may adapt one or more shaped beams based on information about the relative motion of the devices 710.

Sample communication circuits that may be used in one or more of the devices 710 will now be described. FIG. 8A illustrates an embodiment of a transmit communication circuit 810 that may be used in T/R circuit 714 (FIG. 7). Transmit communication circuit 810 may be used to generate OFDM electrical signals that drive one or more of the antenna elements 716 (FIG. 7). During operation, data 812 is received. This data may be encoded or modulated (for example, using cyclic encoding) by modulation circuit 814, and corresponding symbols for a group of sub-channels may be determined by performing the IDFT using IDFT circuit 816.

Next, the symbols may be converted to analog electrical signals using D/A conversion circuit 818. These analog electrical signals may be radio frequency ('RF') up-converted to one or more appropriate frequency bands using one or more carrier frequencies $f_i$ associated with one or more sub-channels in frequency-conversion circuit 820 (such as a mixer or a heterodyne mixer). Then, the electrical signals may be amplified by power amplifier 822 and output to one or more of the antenna elements 716 (FIG. 7) for transmission via one or more communication paths in communication channel 718 (FIG. 7).

Figure 8B:
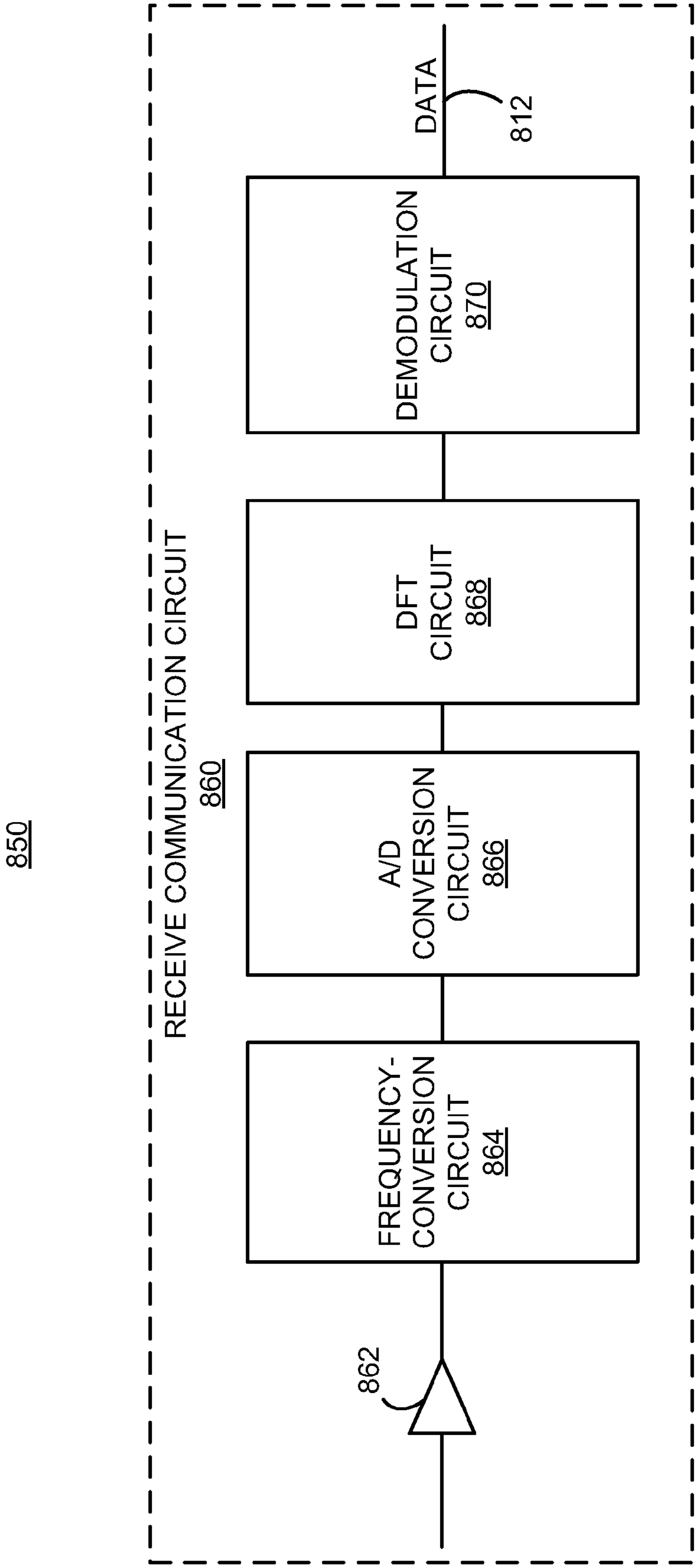
FIG. 8B is a simplified block diagram illustrating an embodiment of a communication circuit.

FIG. 8B illustrates an embodiment of a receive communication circuit 860 that may be used in T/R circuit 714 (FIG. 7). Receive communication circuit 860 may be used to decode OFDM electrical signals that are received by one or more of the antenna elements 720 (FIG. 7). During operation, electrical signals are received and amplified by low-noise amplifier 862. These electrical signals may be RF down-converted from one or more frequency bands using one or more carrier frequencies $f_i$ associated with one or more sub-channels in frequency-conversion circuit 864 (such as a mixer or a heterodyne mixer).

Next, the analog electrical signals may be converted to digital electrical signals using A/D conversion circuit 866. Then, the data associated with the symbols in the group of sub-channels may be detected using DFT circuit 868. Moreover, data 862 may be decoded or de-modulated using demodulation circuit 870.

In some embodiments, antenna elements and/or one or more of antennas 716 and 720 (FIG. 7), may be: external to the transmit communication circuit 810 (FIG. 8A) and/or the receive communication circuit 860, on-chip, on the package or chip carrier, or on another integrated circuit (for example, in a chip stack). Moreover, in some embodiments, at least some of the signals transmitted by different antennas and/or antenna elements are distinguished from each other based on one or more of: encoding (such as TDMA, FDMA, and CDMA), spatial diversity (such as multiple-input multiple-output communication), or polarization diversity (e.g., there may be different polarizations of at least some of the signals transmitted by different antennas and/or antenna elements).

In various implementations, the transmit communication circuit 810 (FIG. 8A) and receive communication circuit 860 may include fewer components or additional components.

Components and/or functionality illustrated in transmit communication circuit 810 (FIG. 8A) and receive communication circuit 860 may be implemented using analog circuits and/or digital circuits. Additionally, components and/or functionality in these communication circuits may be implemented using hardware and/or software.

Moreover, two or more components in transmit communication circuit 810 (FIG. 8A) and receive communication circuit 860 may be combined into a single component and/or the position of one or more components may be changed. Also, the transmit communication circuit 810 (FIG. 8A) and receive communication circuit 860 may be included in one or more integrated circuits on one or more semiconductor die.

As noted previously, the IDFT, DFT, RF up-conversion and down-conversion, D/A conversion and ND conversion illustrated in these circuits may consume significant power, especially at high frequencies. Hence, it may be desirable to implement the IDFT and the DFT using passive circuitry as taught herein.

Figure 9:
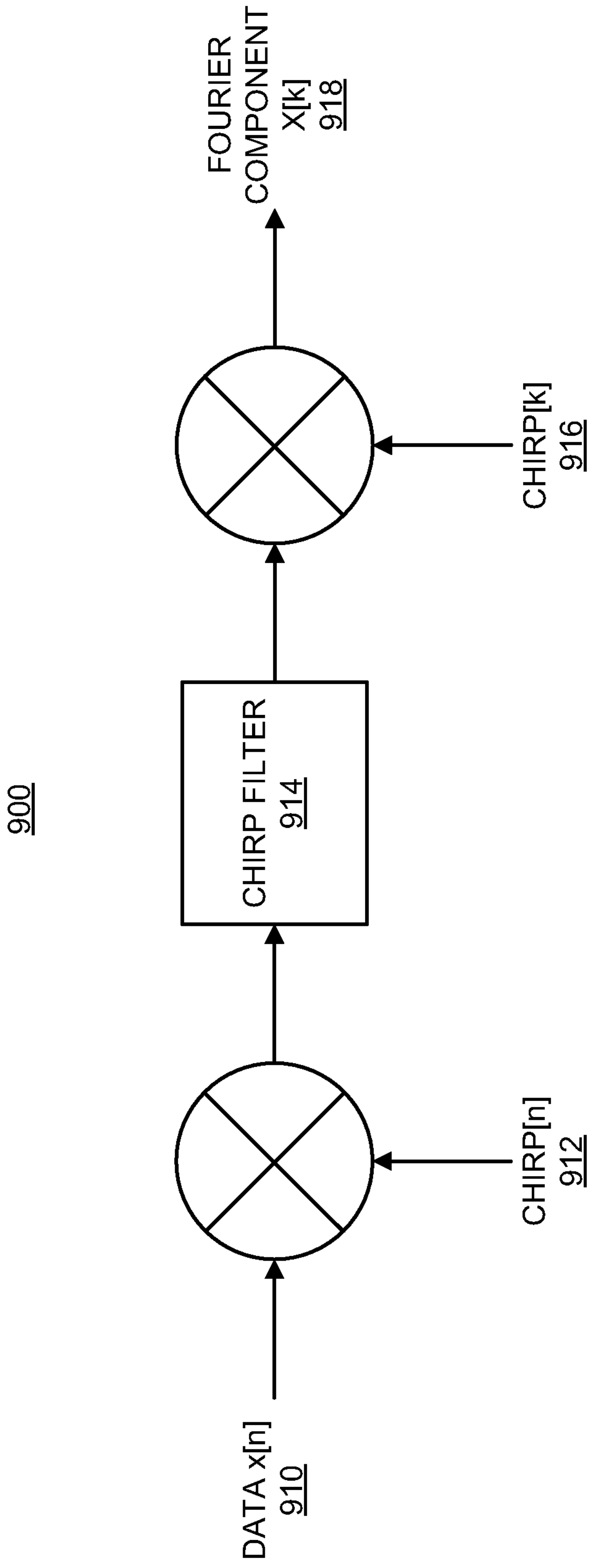
FIG. 9 is a simplified block diagram illustrating a transform design.

FIG. 9 depicts a block diagram illustrating an embodiment of a transform 900 that provides a basis of a passive implementation of the DFT and/or the IDFT, which may be implemented at high frequencies (thereby allowing the frequency conversion operations to be excluded in some embodiments).

In particular, the DFT is defined as:

$$X[k] = \sum_{n=0}^{N-1} x[n]e^{-j\frac{2\pi}{N}kn}, \qquad \text{EQUATION 1}$$

where X is a frequency-domain signal, k denotes samples in the frequency domain (ω), x is a time-domain signal, n denotes samples in the time domain (t), and N defines the DFT sample size. Here, 1/N defines the DFT resolution. More generally, in some embodiments a resolution includes a minimum range of frequencies associated with a datum in the output of the passive beamformers, such as the passive beamformers 1014 described in FIGS. 10A and 10B. Because $-2t\omega$ is equivalent to $(t-\omega)^2-t^2-\omega^2$, the DFT may be re-expressed as:

$$X[k] = e^{-\frac{1}{2}j\left(\frac{2\pi}{N}k\right)^2} \sum_{n=0}^{N-1} x[n] e^{-\frac{1}{2}n^2} e^{j\frac{1}{2}\left(\frac{2\pi}{n}k-n\right)^2}. \qquad \text{EQUATION 2}$$

A similar expression may be derived for the IDFT.

The phase term in the DFT may be written as the sum of three quadratic components, which are known as chirps. Data x[n] 910 may be multiplied using a chirp[n] multiplier 912. Then, resulting electrical signals may be passed through a chirp filter 914, and the discrete Fourier component X[k] 918 is obtained by multiplying this result using another chirp[k] multiplier 916.

At microwave frequencies, the combination of a chirp multiplier and a chirp filter, which perform operations (i.e., the DFT) on spatial samples of analog, continuous-time electrical signals, may be implemented using one or more passive beamformers, such as one or more Rotman lenses.

However, for a Rotman lens of a given size, there are errors in the accuracy of the DFT or IDFT transformation associated with aberration (due to the focal points) and the diffraction limit. These errors limit the resolution of sampling in the transformation implemented using a Rotman lens of a given size. For example, for the DFT, the number of DFT points may be limited by these errors. In many applications, improving the resolution by increasing the size of a Rotman lens is not a viable option. Consequently, in accordance with the teachings herein, two or more Rotman lenses may be operated in parallel or sequentially to increase the resolution without increasing the size of a given Rotman lens.

Figure 10A:
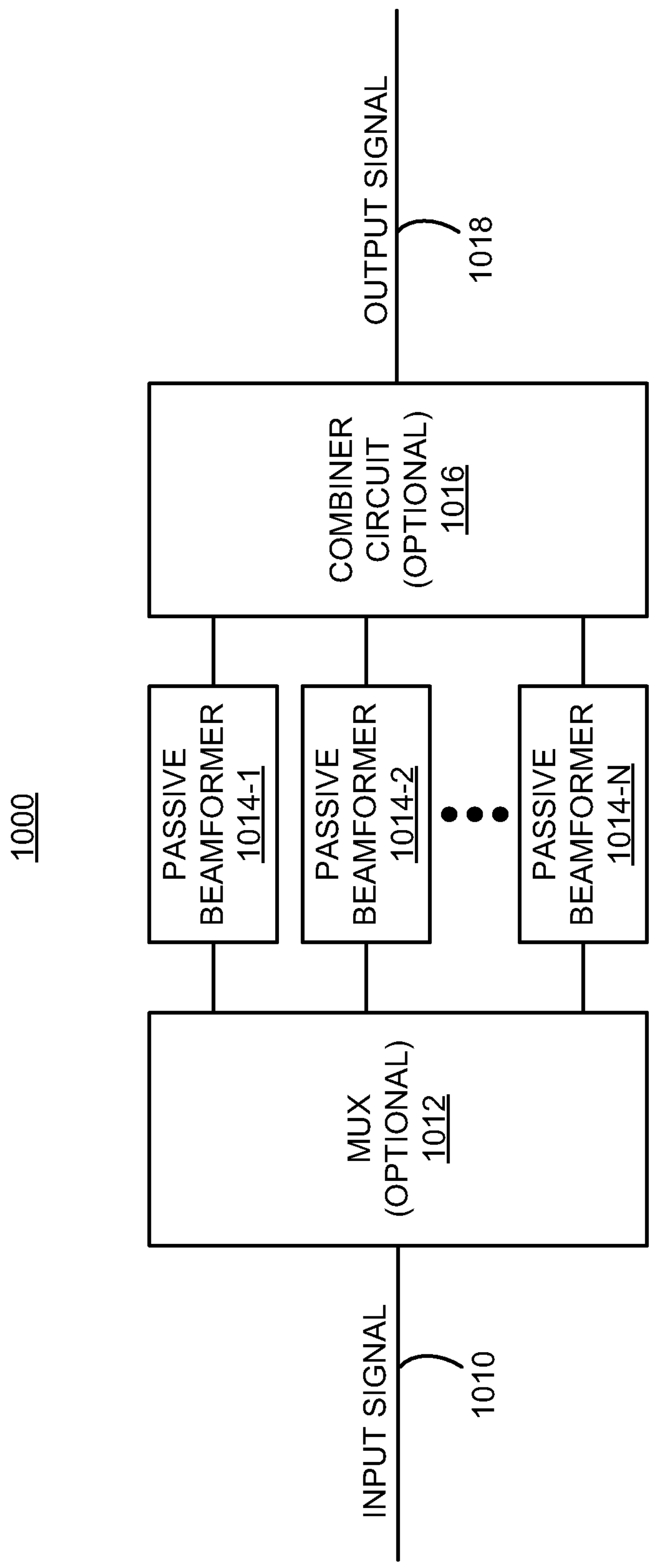
FIG. 10A is a simplified block diagram illustrating an embodiment of a transform circuit.

FIG. 10A depicts an embodiment of a transform circuit 1000. In this circuit, an electrical signal such as input signal 1010 is received, for example, from at least one antenna element. Next, one or more passive beamformers 1014 (such as one or more Rotman lenses) transform the input signal 1010 from one domain to another domain. For example, the one or more passive beamformers 1014 may perform at least a portion of the DFT operation. In some embodiments of a given Rotman lens, the electrical signal enters via meander delay lines (henceforth referred to as input ports) and the transformation is provided on the beam ports (henceforth referred to as output ports). A transformation of the input signal 1010 by a given passive beamformer may have a first resolution (such as that corresponding to a first number of DFT points).

In some embodiments, outputs from the passive beamformers 1014 may correspond to orthogonal groups (this correspondence may include embodiments where the outputs are orthogonal groups). In particular, the outputs may include combinations of two groups of symbols, a and b, where group a includes $\{0, a_1, 0\ a_2, 0, a_3, \ldots\}$ and group b includes $\{b_1, 0\ b_2, 0, b_3, \ldots\}$. The product of a and b is zero, i.e., a and b are orthogonal, making groups a and b orthogonal groups. For example, an output from one of the passive beamformers 1014, such as passive beamformer 1014-1, may be a+b and an output from another of the passive beamformers 1014, such as passive beamformer 1014-2, may be a−b. Consequently, one half of the sum and one half of the difference of these outputs yield, respectively, group a and group b.

Therefore, in some embodiments an optional combiner circuit 1016 combines the outputs from the one or more passive beamformers 1014 to generate the orthogonal groups. For example, the combiner circuit may include multiple magic-Ts. The resulting output signal 1018 may be the DFT of the input signal 1010. Moreover, the transformation may be implemented passively without phase shifting the input signal 1010.

The optional combiner circuit 1016 may combine the outputs from two or more of the passive beamformers 1014 and may produce a combined output having a second resolution (such as that corresponding to a second number of DFT points, which may be larger than the resolution corresponding to the first number of DFT points) and which has an associated error. As discussed further below with reference to FIG. 13, this error may be less than a cumulative error associated with two or more of the passive beamformers 1014 if the passive beamformers are operated to transform the input signal 1010 at the second resolution.

In an exemplary embodiment, two passive beamformers 1014 each perform an N-point DFT on the input signal 1010, and the optional combiner 1016 combines their outputs to achieve a 2N-point DFT with a lower error than if one of the passive beamformers 1014 had been operated to transform the input signal 1010 at this resolution.

In some cases two or more of the passive beamformers 1014 each transform the input signal 1010 from the at least one antenna element in parallel with each other. Alternatively, each of the passive beamformers 1014 may receive a given electrical signal from a corresponding antenna element. The given electrical signal may be associated with a band of frequencies that is at least partially different from bands of frequencies associated with the electrical signals from other antenna elements. Moreover, at least two of the antenna elements may be associated with different polarizations.

In some embodiments the transform circuit 1000 includes an optional multiplexer 1012. This multiplexer may selectively couple the electrical signals from one or more antenna elements (such as the electrical signal from the at least one antenna element) to a given passive beamformer in two or more of the passive beamformers 1014. Consequently, two or more of the passive beamformers 1014 may be configured to serially transform the input signal 1010.

Figure 10B:
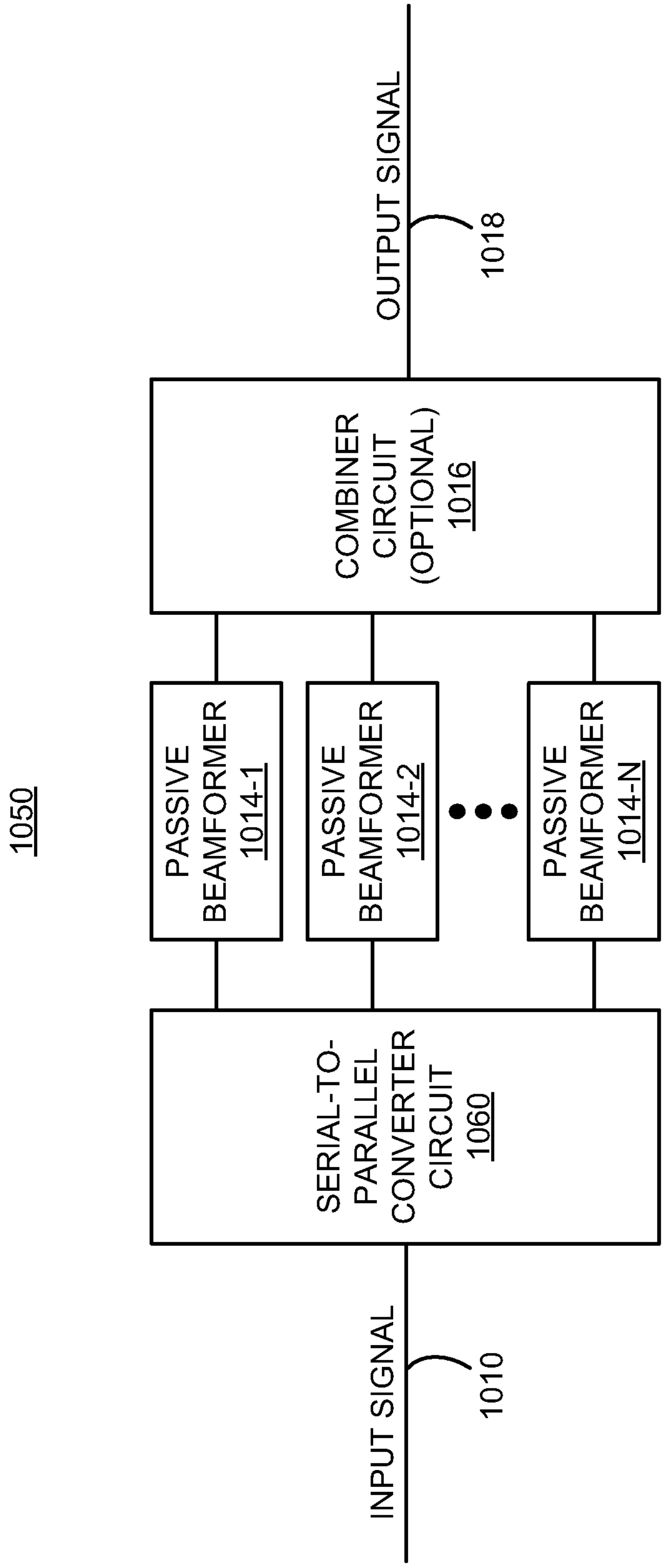
FIG. 10B is a simplified block diagram illustrating an embodiment of a transform circuit.

FIG. 10B illustrates an embodiment of a transform circuit 1050. In this circuit, a serial-to-parallel conversion circuit 1060 converts a time domain input signal 1010 into a spatial signal, and at least one passive beamformer, such as passive beamformer 1014-1, transforms this spatial signal from one domain to another domain.

Figure 11:
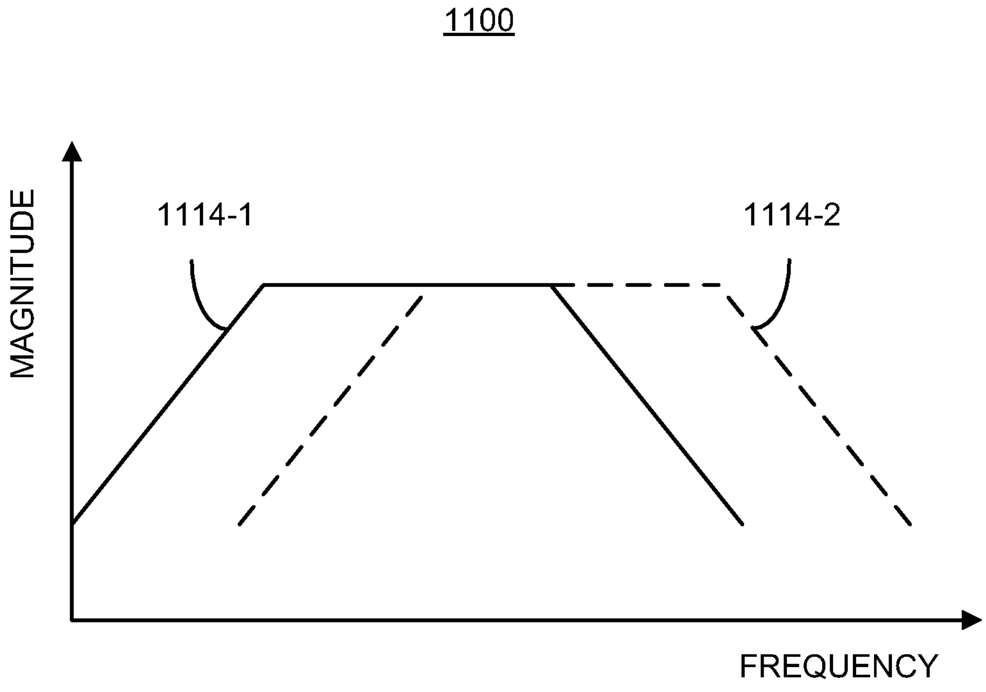
FIG. 11 is a simplified graph illustrating passbands of components.

As discussed below with reference to FIG. 11, the at least one passive beamformer may have a passband of frequencies that is at least partially different than a passband of frequencies associated with the serial-to-parallel conversion circuit 1060. This configuration may facilitate the transformation over a larger band of frequencies than the passband of frequencies associated with the at least one passive beamformer or the passband of frequencies associated with the serial-to-parallel conversion circuit 1060.

As discussed below with reference to FIGS. 12A and 12B, this serial-to-parallel converter circuit may also perform a cyclic shift on samples of the input signal 1010. For example, the transform circuit 1050 may include two passive beamformers 1014 and the serial-to-parallel conversion circuit 1060 may couple odd samples of the input signal 1010 to a first passive beamformer and may couple even samples of the input signal 1010 to the second passive beamformer.

While the preceding discussion has used the DFT as an illustrative example, in other embodiments variations on transform circuits 1000 (FIG. 10A) and/or 1050 are used to implement the IDFT on data that is to be transmitted, which is then output to at least one antenna element. Also, the teachings herein may be employed to perform FFT operations, IFFT operations, or other transform operations.

In practice, transform circuits 1000 (FIG. 10A) and 1050 may include fewer or additional components. For example, depending on the application the output may be processed directly or may be RF down-converted to the baseband for further analysis. Moreover, in some embodiments the passive beamformers 1014 may include active components (e.g., an amplifier may proceed or follow a Rotman lens). Additionally, two or more components may be combined into a single component, and/or a position of one or more components may be changed.

As noted previously, a Rotman lens may have three focal points. When implementing a DFT, the Fourier coefficients at these three focal points are precise. However, between these focal points an aberration occurs that contributes to the error during the transformation. The length of each meander line in the Rotman lens along with the shape of the input and output contours and location of input and output ports may be designed so that the paths of each of the propagating beams in the lens would give the $2\pi kn/N$ phase shift employed for the DFT. In real time, a data stream carried on an RF carrier frequency, e.g., 60 GHz, may be sent over the feeding line passing through the input ports, and the associated samples may propagate through the meander lines into the lens and the phase shifted samples may be summed up at the output ports.

In an exemplary embodiment, a given Rotman lens in the transform circuits 1000 (FIG. 10A) and 1050 has an N of 33, a focal length F of 6 cm, and aberration parameters $\alpha$ of 25 degrees and g (equal to G/F) of 1. At 60 GHz, the given Rotman lens has a cross-sectional length of 5-6 cm. However, by using high permittivity materials, this cross-sectional length may be reduced by a factor of 3.

As noted previously, by using at least partially different bandwidths for components in the transform circuits 1000 (FIG. 10A) and/or 1050, the effective bandwidth of the transformation may be increased. This is shown in FIG. 11, where a graph 1100 illustrates magnitude as a function of frequency for passbands of components 1114. In particular, by designing the serial-to-parallel conversion circuit 1060 and the one or more passive beamformers 1014 to have passbands at different frequencies, overall bandwidth for a given error may be increased by a factor of 3.

Figure 12A:
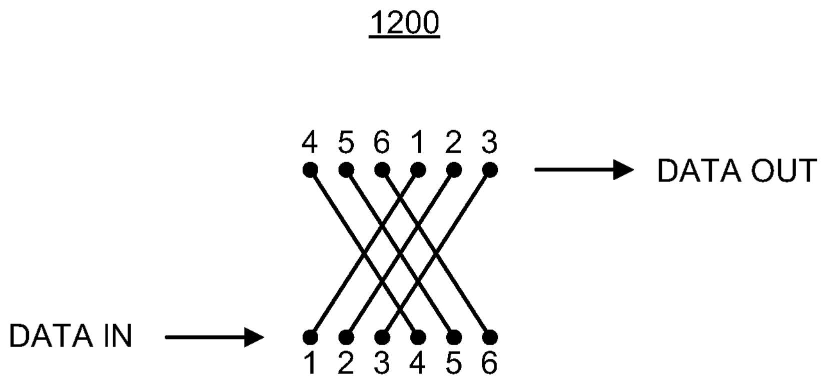
FIG. 12A is a diagram illustrating an embodiment of a cyclic shift of data.

FIG. 12A is a block diagram illustrating an embodiment 1200 of a cyclic shift of data for a single passive beamformer. For example, this cyclic or circular shift may be performed at the input and output ports of a Rotman lens.

Figure 12B:
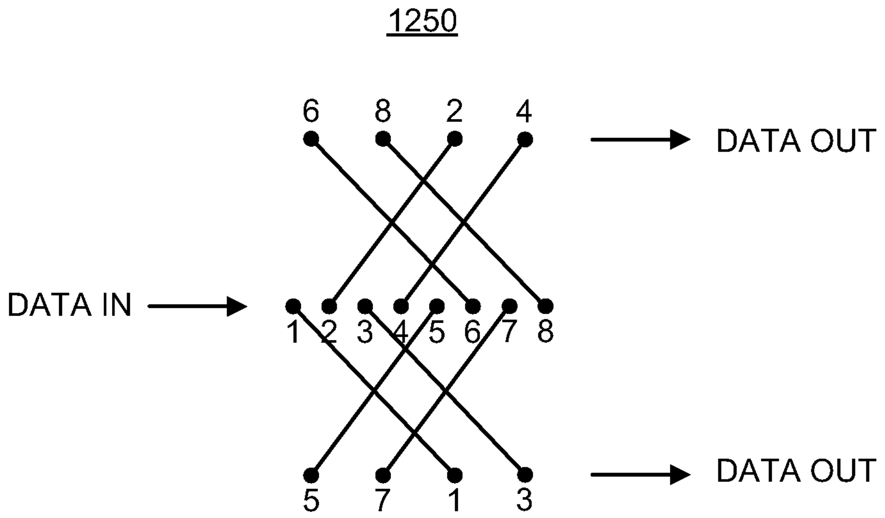
FIG. 12B is a diagram illustrating an embodiment of a cyclic shift of data.

FIG. 12B is a block diagram illustrating an embodiment 1250 of a cyclic shift of data for two passive beamformers. Here, cyclically shifted even samples are provided to one passive beamformer and cyclically shifted odd samples are provided to the other passive beamformer.

Figure 13:
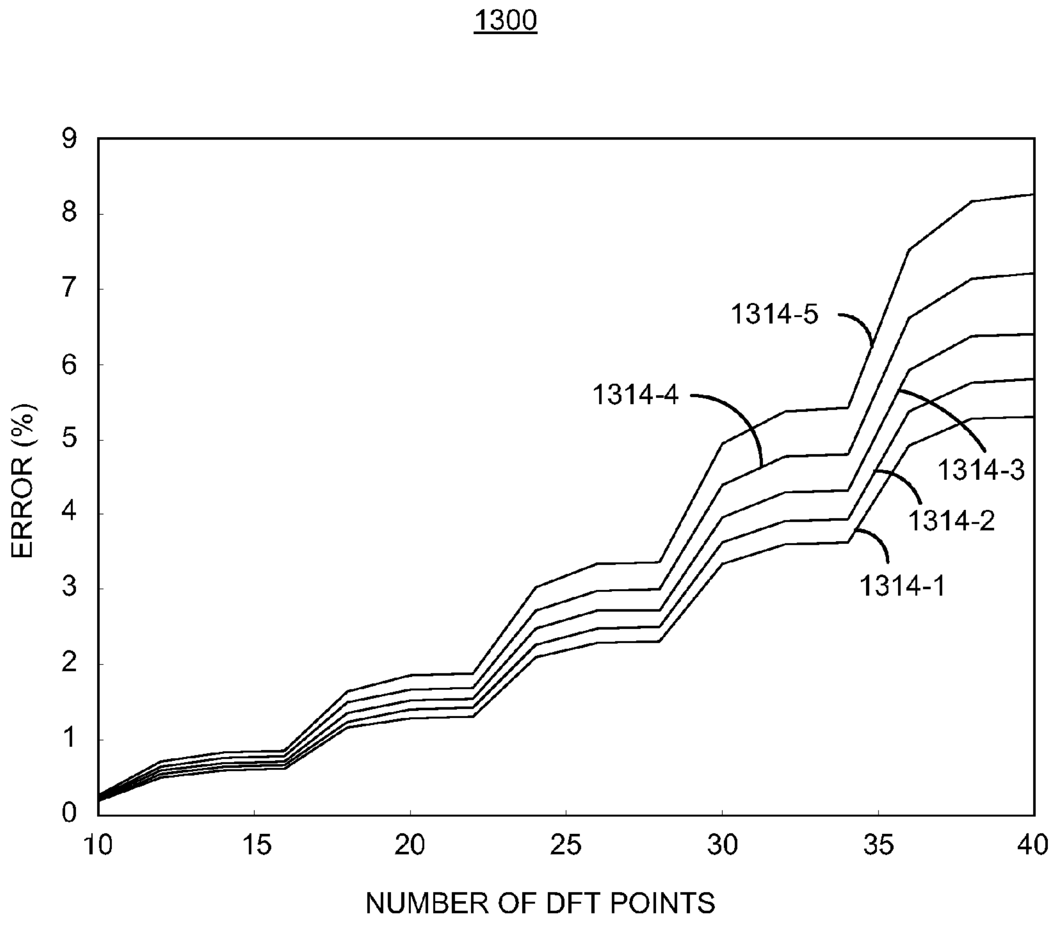
FIG. 13 is a simplified graph illustrating error as a function of a number of discrete Fourier transform points.

By using multiple Rotman lenses to perform the transformation at a first resolution and combining their outputs to obtain the transformation at a second resolution, the cumulative error (for a given sized Rotman lens) may be reduced relative to the cumulative error that would occur if the Rotman lenses performed the transformation directly at the second resolution. FIG. 13 depicts a graph 1300 illustrating error vs. number of DFT points for an example transformation circuit. The y-axis corresponds to error (in percent) of the transformation circuit and is shown as a function of the number of discrete Fourier transform points (x-axis), for carrier frequencies of 50 GHz (line 1314-1), 55 GHz (line 1314-2), 60 GHz (line 1314-3), 65 GHz (line 1314-4), and 70 GHz (line 1314-5). For example, a 28-point DFT may be implemented using two 14-port Rotman lenses (e.g., as the passive beamformers 1014 in FIG. 10A) and 14 2×2 magic Ts (e.g., as the optional combiner circuit 1016 in FIG. 10A). Simulations indicate that the root-mean square (RMS) error associated with the 28-point DFT transformation is slightly higher than error of a 14-point DFT (1% for a 1 GHz bandwidth on a 60 GHz carrier frequency) and significantly less than a 28-point DFT transformation performed by a single lens.

Figure 14:
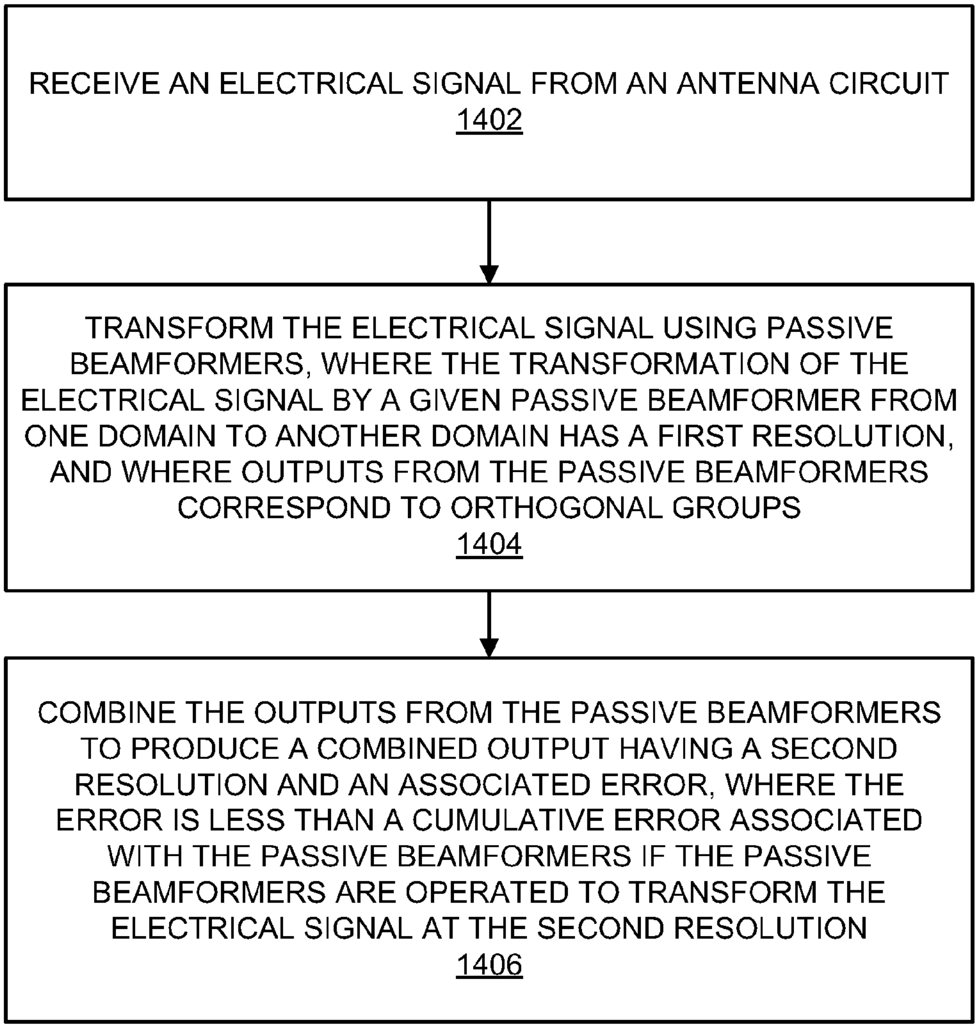
FIG. 14 is a simplified flowchart illustrating an embodiment of a process for transforming an electrical signal.

Sample embodiments of processes for transforming one or more electrical signals are now described. FIG. 14 depicts a flowchart illustrating an embodiment of a process for transforming an electrical signal, which may be performed by a device (e.g., one of the devices 710 of FIG. 7). During operation, the device receives an electrical signal from an antenna element (block 1402) and transforms the electrical signal using passive beamformers (block 1404). The transformation of the electrical signal by a given passive beamformer from one domain to another domain has a first resolution, and outputs from the passive beamformers correspond to orthogonal groups. Next, the device combines the outputs from the passive beamformers to produce a combined output having a second resolution and an associated error (block 1406), where the error is less than a cumulative error associated with the passive beamformers if the passive beamformers are operated to transform the electrical signal at the second resolution.

Figure 15:
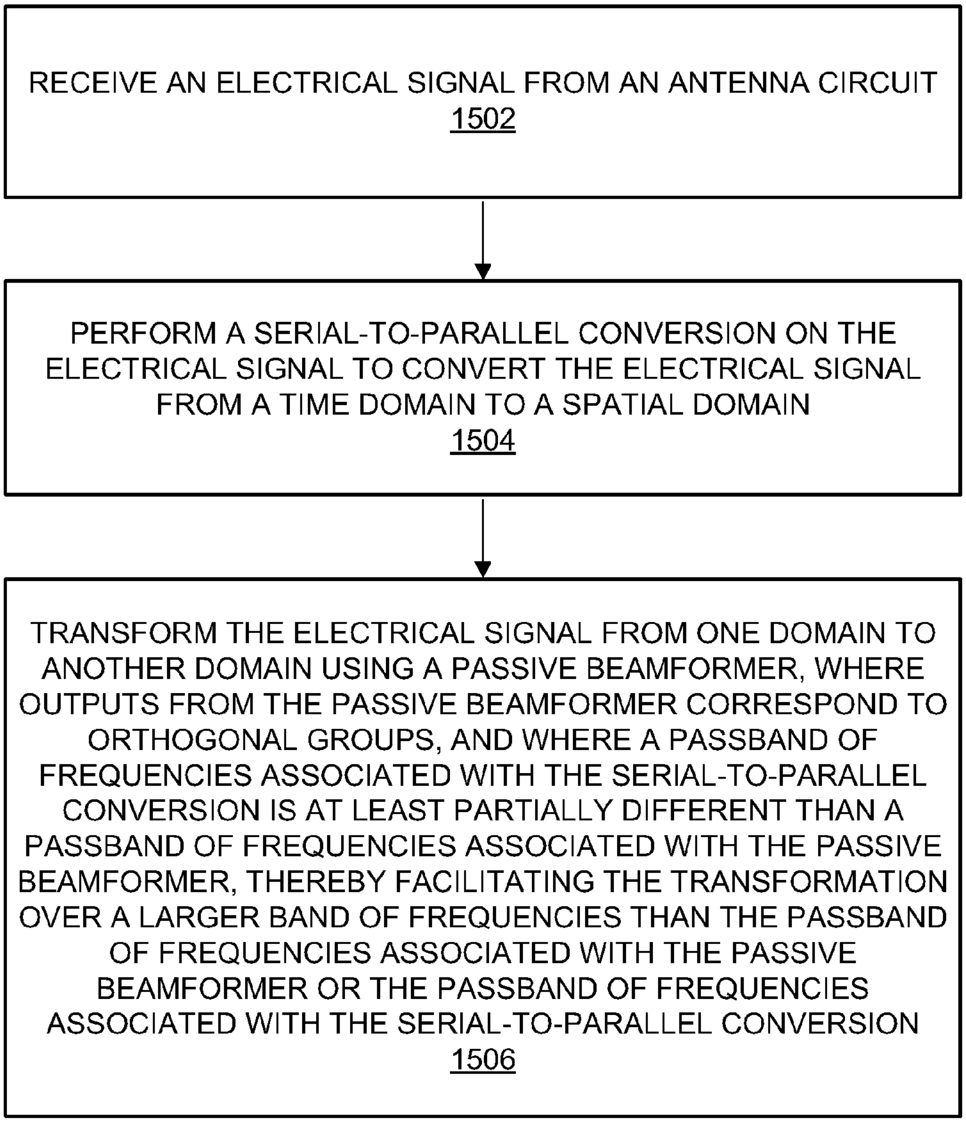
FIG. 15 is a simplified flowchart illustrating an embodiment of a process for transforming an electrical signal.

FIG. 15 depicts a flowchart illustrating an embodiment of a process for transforming an electrical signal, which may be performed by the device. During operation, the device receives an electrical signal from an antenna element (block 1502) and performs a serial-to-parallel conversion on the electrical signal to convert the electrical signal from a time domain to a spatial domain (block 1504). Next, the device transforms the electrical signal from one domain to another domain using a passive beamformer (block 1506), where outputs from the passive beamformer correspond to orthogonal groups. A passband of frequencies associated with the serial-to-parallel conversion is at least partially different than a passband of frequencies associated with the passive beamformer, thereby facilitating the transformation over a larger band of frequencies than the passband of frequencies associated with the passive beamformer or the passband of frequencies associated with the serial-to-parallel conversion.

In practice, there may be additional or fewer operations in processes described herein (e.g., in FIG. 14 and/or FIG. 15). Moreover, the order of the operations may be changed, and two or more operations may be combined into a single operation.

Devices and circuits described herein may be implemented using computer-aided design tools available in the art, and embodied by computer-readable files containing software descriptions of such circuits. These software descriptions may be: at behavioral, register transfer, logic component, transistor and layout geometry-level descriptions. Moreover, the software descriptions may be stored on storage media or communicated by carrier waves.

Data formats in which such descriptions may be implemented include, but are not limited to: formats supporting behavioral languages such as C, formats supporting register transfer level ("RTL") languages such as Verilog and VHDL, formats supporting geometry description languages (e.g., GDSII, GDSIII, GDSIV, CIF, and MEBES), and other suitable formats and languages. Moreover, data transfers of such files on machine-readable media including carrier waves may be done electronically over diverse media on the Internet or, for example, via email. Physical files may be implemented on machine-readable media such as: 4 mm magnetic tape, 8 mm magnetic tape, 3½ inch floppy media, CDs, DVDs, and so on.

Figure 16:
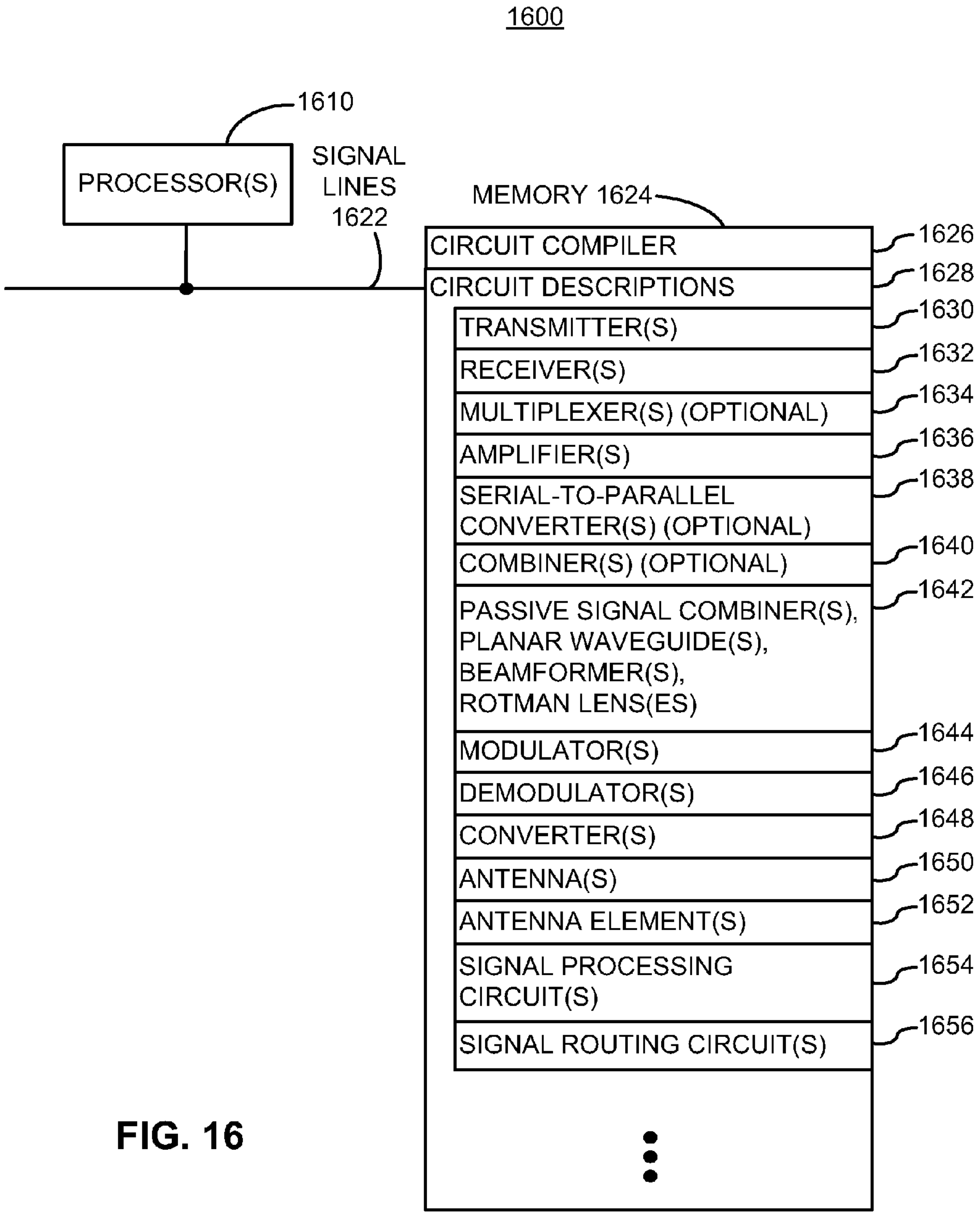
FIG. 16 is a simplified block diagram illustrating an embodiment of a signal processing system.

FIG. 16 depicts a block diagram illustrating an embodiment of a system 1600 that stores such computer-readable files. This system may include at least one data processor or central processing unit ("CPU") 1610, memory 1624 and one or more signal lines or communication busses 1622 for coupling these components to one another. Memory 1624 may comprise high-speed random access memory and/or non-volatile memory, such as: ROM, RAM, EPROM, EEPROM, Flash, one or more smart cards, one or more magnetic disc storage devices, and one or more optical storage devices.

Memory 1624 may store a circuit compiler 1626 and circuit descriptions 1628. Circuit descriptions 1628 may include descriptions of the circuits, or a subset of the circuits discussed above. For example, circuit descriptions 1628 may include circuit descriptions of at least one of: one or more communication circuits (including one or more transmitters 1630 and/or one or more receivers 1632), one or more optional multiplexers 1634, one or more amplifiers 1636, one or more optional serial-to-parallel converters 1638, one or more optional combiners 1640, one or more passive signal combiners, planar waveguides, beamformers, Rotman lenses 1642, one or more modulators 1644, one or more demodulators 1646, one or more converters 1648 (such as a frequency converter, an ND converter, and a D/A converter), one or more antennas 1650, one or more antenna elements 1652, one or more signal processing circuits 1654, or one or more signal routing circuits 1656.

The system 1600 may include fewer or additional components. Moreover, two or more components may be combined into a single component and/or a position of one or more components may be changed.

Embodiments of apparatuses (e.g., circuit, an integrated circuit that includes the circuit) and techniques for transforming one or more electrical signals have thus been described. These circuits, integrated circuits, and techniques may be used to transform electrical signals from one domain to another domain. In particular, these techniques may be used to implement one or more of: an FFT, an IFFT, a discrete Fourier transform (DFT), an inverse discrete Fourier transform (IDFT), or some other transform, using passive beamformers (Rotman lenses). In some aspects, these techniques may be used to transform analog and/or continuous time electrical signals. Moreover, in communication systems these transformations may be performed at elevated frequencies, e.g., without a frequency conversion to baseband. Consequently, these techniques may facilitate simpler circuits that: occupy less area, consume less power and have reduced expense.

In some embodiments the circuit includes an input node that receives an electrical signal from an antenna element. The input node is coupled to passive beamformers that transform the electrical signal from one domain to another domain. A transformation of the electrical signal by a given passive beamformer has a first resolution, and outputs from the passive beamformers correspond to orthogonal groups. Moreover, a combiner circuit combines the outputs from the passive beamformers and produces a combined output having a second resolution (e.g., greater than the first resolution) and an associated error. This error is less than a cumulative error associated with the passive beamformers if the passive beamformers are operated to transform the electrical signal at the second resolution.

The circuit may receive the electrical signal or signals from an antenna, which includes multiple antenna elements. Such an antenna may comprise, for example, a phase-arrayed antenna that includes multiple antenna elements.

As mentioned above, a combiner circuit may be employed to combine the outputs from the passive beamformers to generate the orthogonal groups. For example, the combiner circuit may include multiple magic-Ts.

Also as mentioned above, one or more of the passive beamformers may comprise a Rotman lens. The beams formed by the passive beamformers may thus include electromagnetic signals or waves. Additionally, the electrical signals (which may include electromagnetic signals or waves) may be in the radio or microwave frequency range. For example, the electrical signals may have fundamental frequencies between about 1 and about 300 GHz, Moreover, the combined output may comprise a discrete Fourier transform (DFT), an inverse discrete Fourier transform (IDFT), or some other transform of the electrical signal.

As discussed above, in some cases the passive beamformers each transform the electrical signal in parallel with each other.

In some embodiments the passive beamformers have passbands of frequencies that are at least partially different, thereby facilitating the transformation over a larger band of frequencies than the passband of frequencies associated with the given passive beamformer.

The circuit may employ a multiplexer, coupled to the at least one input node and the passive beamformers, that selectively couples the electrical signal to the given passive beamformer. Moreover, the passive beamformers may serially transform the electrical signal.

The circuit may employ a serial-to-parallel converter, coupled to the at least one input node and the passive beamformers, that performs a cyclic shift on samples of the electrical signal. For example, the passive beamformers may include a first passive beamformer and a second passive beamformer, and the serial-to-parallel converter may couple odd samples of the electrical signal to the first passive beamformer and may couple even samples of the electrical signal to the second passive beamformer. Additionally, a passband of frequencies associated with the serial-to-parallel converter may be at least partially different than a passband of frequencies associated with the passive beamformers. This may facilitate the transformation over a larger band of frequencies than the passband of frequencies associated with the passive beamformers or the passband of frequencies associated with the serial-to-parallel converter.

In some embodiments the circuit includes multiple input nodes, each of which receives an electrical signal from a corresponding antenna element, where a given input node may couple the electrical signal from a given input node to a given passive beamformer. Moreover, the electrical signal associated with the given input node may be associated with a band of frequencies that is at least partially different from bands of frequencies associated with the electrical signal from at least one other input node. Also, at least two of the antenna elements are associated with different polarizations in some cases.

In another embodiment of the circuit, the input node receives the electrical signal from the antenna element, and another serial-to-parallel converter, coupled to the input node, converts the electrical signal from a time domain to a spatial domain. A passive beamformer, coupled to the other serial-to-parallel converter, transforms the electrical signal from one domain to the other domain, where outputs from the passive beamformer correspond to orthogonal groups. For example, in some embodiments the transform from one domain to another is from a time domain to a frequency domain (or a spatial domain to a spatial frequency domain) or vice versa. A passband of frequencies associated with the other serial-to-parallel converter may be at least partially different than a passband of frequencies associated with the passive beamformer, thereby facilitating the transformation over a larger band of frequencies than the passband of frequencies associated with the passive beamformer or the passband of frequencies associated with the other serial-to-parallel converter. Thus, a first serial-to-parallel converter may be employed to perform a cyclic shift of samples of the electrical signal and a second serial-to-parallel employed to convert the transformed electrical signal to serial form.

In addition, another serial-to-parallel converter may perform a cyclic shift on samples in the electrical signal. Moreover, the circuit may include a combiner circuit, coupled to the passive beamformer, that combines the outputs from the passive beamformer to generate the orthogonal groups.

In some implementations one or more of: a receiver, a transmitter, a memory controller, or a memory device may form an embodiment of the circuit. Moreover, these components may be implemented on one or more integrated circuits.

In some aspects the teachings herein may be employed in a system that includes a device that communicates information with another device. Either of these devices may include an embodiment of the circuit.

In some aspects the teachings herein may be implemented in a computer-readable medium that includes data that describes one or more of: the circuit, the receiver, the transmitter, the memory controller, the memory device, or the system.

Another embodiment provides a first method for transforming an electrical signal, which may be performed by the device. During operation, the device receives an electrical signal from an antenna element and transforms the electrical signal using passive beamformers. The transformation of the electrical signal by a given passive beamformer from one domain to another domain has a first resolution, and outputs from the passive beamformers correspond to orthogonal groups. Next, the device combines the outputs from the passive beamformers to produce a combined output having a second resolution and an associated error, where the error is less than a cumulative error associated with the passive beamformers if the passive beamformers are operated to transform the electrical signal at the second resolution.

Another embodiment provides a second method for transforming an electrical signal, which may be performed by the device. During operation, the device receives an electrical signal from an antenna element and performs a serial-to-parallel conversion on the electrical signal to convert the electrical signal from a time domain to a spatial domain. Next, the device transforms the electrical signal from one domain to another domain using a passive beamformer, where outputs from the passive beamformer correspond to orthogonal groups. A passband of frequencies associated with the serial-to-parallel conversion is at least partially different than a passband of frequencies associated with the passive beamformer, thereby facilitating the transformation over a larger band of frequencies than the passband of frequencies associated with the passive beamformer or the passband of frequencies associated with the serial-to-parallel conversion.

The aforementioned embodiments may be used in a wide variety of applications, including, for example: serial or parallel wireless links, wireless communication, wireless metropolitan area networks (such as WiMax), wireless local area networks (WLANs), wireless personal area networks (WPANs), and systems and devices that include one or more antennas or antenna elements (such as radar applications, including vehicular radar). For example, the embodiments may be used in conjunction with multi-tone communication (such as orthogonal frequency-division multiplexing or OFDM), ultra-wide-band (UWB) communication and/or a communication standard associated with the Multi-Band OFDM Alliance (MBOA). Moreover, the embodiments may be used in: image processing (such as security imaging), radio astronomy, chemical analysis (such as chromatography), and/or applications that utilize a Fourier transform and/or an inverse Fourier transform. Additionally, the aforementioned embodiments may be used in: desktop or laptop computers, hand-held or portable devices (such as personal digital assistants and/or cellular telephones), set-top boxes, home networks, and/or video-game devices.

The teachings herein may be embodied in a wide variety of forms, some of which may appear to be quite different from those of the disclosed embodiments. Consequently, the specific structural and functional details disclosed herein are merely representative and do not limit the scope of the disclosure. For example, based on the teachings herein one skilled in the art should appreciate that the various structural and functional details disclosed herein may be incorporated in an embodiment independently of any other structural or functional details. Thus, an apparatus may be implemented or a method practiced using any number of the structural or functional details set forth in any disclosed embodiment(s). Also, an apparatus may be implemented or a method practiced using other structural or functional details in addition to or other than the structural or functional details set forth in any disclosed embodiment(s).

The various structures and functions described herein may be implemented in various ways and using a variety of apparatuses. For example, a device may be implemented by various hardware components such a processor, a controller, a state machine, logic, or some combination of one or more of these components.

In some embodiments code including instructions (e.g., software, firmware, middleware, etc.) may be executed on one or more processing devices to implement one or more of the described functions or components. The code and associated components (e.g., data structures and other components by the code or to execute the code) may be stored in an appropriate data memory that is readable by a processing device (e.g., commonly referred to as a computer-readable medium).

In some embodiments an apparatus constructed in accordance with the teachings herein may comprise a circuit description stored on a machine-readable media. Such a circuit description may implement, for example, one or more functions or components as taught herein.

The recited order of the blocks in the processes disclosed herein is simply an example of a suitable approach. Thus, operations associated with such blocks may be rearranged while remaining within the scope of the present disclosure. Similarly, the accompanying method claims present operations in a sample order, and are not necessarily limited to the specific order presented.

The components and functions described herein may be connected or coupled in various ways. The manner in which this is done may depend, in part, on whether and how the components are separated from the other components. In some embodiments some of the connections or couplings represented by the lead lines in the drawings may be in an integrated circuit, on a circuit board or implemented as discrete wires, or in some other way.

The signals discussed herein may take various forms. For example, in some embodiments a signal may comprise electrical signals transmitted over a wire, light pulses transmitted through an optical medium such as an optical fiber or air, or RF waves transmitted through a medium such as air, etc. In addition, a plurality of signals may be collectively referred to as a signal herein. The signals discussed above also may take the form of data. For example, in some embodiments an application program may send a signal to another application program. Such a signal may be stored in a data memory.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

While certain sample embodiments have been described above in detail and shown in the accompanying drawings, it is to be understood that such embodiments are merely illustrative of and not restrictive of the teachings herein. In particular, it should be recognized that the teachings herein may apply to a wide variety of apparatuses and methods. It will thus be recognized that various modifications may be made to the illustrated and other embodiments as taught herein, without departing from the broad inventive scope thereof. In view of the above it will be understood that the teachings herein are not limited to the particular embodiments or arrangements disclosed, but are rather intended to cover any changes, adaptations or modifications which are within the scope of the appended claims.

What is claimed is:

1. A signal processing apparatus, comprising:

an input node configured to receive an input signal;

a serial-to-parallel converter comprising a set of at least one delay element coupled in series with the input node to provide at least one delayed version of the input signal, wherein the serial-to-parallel converter is configured to output a set of parallel signals including the at least one delayed version of the input signal;

at least one passive signal combiner coupled to the serial-to-parallel converter and configured to combine the set of parallel signals to provide a plurality of substantially orthogonal signals; and a signal processing circuit coupled to the at least one passive signal combiner and configured to provide, based on the plurality of substantially orthogonal signals, at least one output signal representing a Fourier transform component of the input signal.

2. The apparatus of claim 1, wherein the serial-to-parallel converter is further configured to provide the set of parallel signals with predefined relative phase shifts to enable the at least one passive signal combiner to provide the plurality of substantially orthogonal signals.

3. The apparatus of claim 1, wherein the at least one passive signal combiner comprises at least one planar waveguide, at least one Rotman lens, or at least one beamformer.

4. The apparatus of claim 1, wherein a frequency passband associated with the serial-to-parallel converter is different than at least one frequency passband associated with the at least one passive signal combiner.

5. The apparatus of claim 1, wherein the apparatus comprises a Fourier transform processor embodied in an integrated circuit.

6. The apparatus of claim 1, wherein the at least one passive signal combiner comprises a first passive signal combiner configured to provide a first subset of the substantially orthogonal signals and a second passive signal combiner configured to provide a second subset of the substantially orthogonal signals.

7. The apparatus of claim 6, wherein the first passive signal combiner comprises a first planar waveguide embodied in a first metal layer of a printed circuit board and the second passive signal combiner comprises a second planar waveguide embodied in a second metal layer of the printed circuit board.

8. The apparatus of claim 6, wherein the first and second passive signal combiners have different frequency passbands.

9. The apparatus of claim 6, wherein:

each of the first and second subsets of substantially orthogonal signals comprises a transformation of the input signal at a first resolution;

the at least one output signal comprises a transformation of the input signal at a second resolution; and the second resolution is greater than the first resolution.

10. The apparatus of claim 6, wherein the signal processing circuit is further configured to combine the first and second subsets of substantially orthogonal signals to provide the at least one output signal.

11. The apparatus of claim 6, wherein the serial-to-parallel converter comprises a time division multiplexer configured to selectively couple different time samples of the input signal to the first and second passive signal combiners.

12. The apparatus of claim 6, wherein the serial-to-parallel converter is further configured to perform a cyclic shift on time samples of the input signal to provide the set of parallel signals.

13. The apparatus of claim 6, wherein the serial-to-parallel converter is further configured to couple odd samples of the input signal to the first passive signal combiner and couple even samples of the input signal to the second passive signal combiner.

14. The apparatus of claim 6, wherein:

the serial-to-parallel converter is further configured to receive at least one other input signal to provide the set of parallel signals; and the input signal and the at least one other input signal are associated with different frequency bands.

15. A method of signal processing, comprising:

receiving an input signal;

performing a serial-to-parallel conversion of the input signal by providing at least one delayed version of the input signal, and outputting a set of parallel signals including the at least one delayed version of the input signal;

combining the set of parallel signals at at least one passive signal combiner to provide a plurality of substantially orthogonal signals; and providing, based on the plurality of substantially orthogonal signals, at least one output signal representing a Fourier transform component of the input signal.

16. The method of claim 15, wherein the serial-to-parallel conversion further comprises providing the set of parallel signals with predefined relative phase shifts to enable the at least one passive signal combiner to provide the plurality of substantially orthogonal signals.

17. The method of claim 15, wherein the at least one passive signal combiner comprises at least one planar waveguide, at least one Rotman lens, or at least one beamformer.

18. The method of claim 15, wherein the at least one passive signal combiner comprises a first passive signal combiner that provides a first subset of the substantially orthogonal signals and a second passive signal combiner that provides a second subset of the substantially orthogonal signals.

19. The method of claim 18, wherein the first passive signal combiner comprises a first planar waveguide embodied in a first metal layer of a printed circuit board and the second passive signal combiner comprises a second planar waveguide embodied in a second metal layer of the printed circuit board.

20. The method of claim 18, wherein the first and second passive signal combiners have different frequency passbands.

21. The method of claim 18, wherein:

each of the first and second subsets of substantially orthogonal signals comprises a transformation of the input signal at a first resolution;

the at least one output signal comprises a transformation of the input signal at a second resolution; and the second resolution is greater than the first resolution.

22. A signal processing apparatus, comprising:

means for receiving an input signal;

means for performing a serial-to-parallel conversion of the input signal by providing at least one delayed version of the input signal, and outputting a set of parallel signals including the at least one delayed version of the input signal;

means for passively combining the set of parallel signals to provide a plurality of substantially orthogonal signals; and means for providing, based on the plurality of substantially orthogonal signals, at least one output signal representing a Fourier transform component of the input signal.

23. A signal processing apparatus, comprising:

a serial-to-parallel converter configured to convert an input signal to a plurality of parallel signals, wherein a first frequency passband is associated with the serial-to parallel converter;

at least one passive signal combiner coupled to the serial-to-parallel converter and configured to combine the set of parallel signals to provide a plurality of substantially orthogonal signals, wherein at least one second frequency passband associated with the at least one passive signal combiner is different than the first frequency passband; and a signal processing circuit coupled to the at least one passive signal combiner and configured to provide, based on the plurality of substantially orthogonal signals, at least one output signal representing a Fourier transform component of the input signal.

24. The apparatus of claim 23, wherein the first frequency passband does not overlap the at least one second frequency passband.

25. The apparatus of claim 23, wherein:

the at least one passive signal combiner comprises a first passive signal combiner configured to provide a first subset of the substantially orthogonal signals and a second passive signal combiner configured to provide a second subset of the substantially orthogonal signals;

the at least one second frequency passband comprises a first combiner passband associated with the first passive signal combiner and a second combiner passband associated with the second passive signal combiner; and the first combiner passband is different than the second combiner passband.

26. The apparatus of claim 25, wherein the first combiner passband does not overlap the second combiner passband.

27. The apparatus of claim 25, wherein the first passive signal combiner comprises a first planar waveguide embodied in a first metal layer of a printed circuit board and the second passive signal combiner comprises a second planar waveguide embodied in a second metal layer of the printed circuit board.

28. The apparatus of claim 23, wherein the apparatus is embodied in an integrated circuit device.

* * * * *